United States Patent
Elliott

(10) Patent No.: US 11,074,381 B2
(45) Date of Patent: Jul. 27, 2021

(54) VERIFICATION OF HARDWARE DESIGN FOR DATA TRANSFORMATION COMPONENT

(71) Applicant: Imagination Technologies Limited, Kings Langley (GB)

(72) Inventor: Sam Elliott, London (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/065,678

(22) Filed: Oct. 8, 2020

(65) Prior Publication Data

US 2021/0103691 A1  Apr. 8, 2021

(30) Foreign Application Priority Data

Oct. 8, 2019  (GB) ...................................... 1914552

(51) Int. Cl.
*G06F 30/30* (2020.01)
*G06F 30/33* (2020.01)
(Continued)

(52) U.S. Cl.
CPC ..... *G06F 30/33* (2020.01); *G01R 31/318314* (2013.01); *G06F 30/337* (2020.01);
(Continued)

(58) Field of Classification Search
None
See application file for complete search history.

(56) References Cited

U.S. PATENT DOCUMENTS 5,163,016 A * 11/1992 Har'El ................ G06F 30/3323
716/102
8,954,909 B2 * 2/2015 Andraus ................ G06F 30/30
716/106

(Continued)

OTHER PUBLICATIONS

H. Barringer et al., "Symbolic verification of hardware systems," IEEE, Proc, of ASP-DAC'95/CHDL'95/VLSI'95 with EDA Technofair, pp. 631-636. (Year: 1995).*

(Continued)

*Primary Examiner* — Leigh M Garbowski
(74) *Attorney, Agent, or Firm* — Potomac Law Group, PLLC; Vincent M DeLuca

(57) ABSTRACT

A hardware design for a main data transformation component is verified. The main data transformation component is representable as a hierarchical set of data transformation components which includes (i) a plurality of leaf data transformation components which do not have children, and (ii) one or more parent data transformation components which each comprise one or more child data transformation components. For each of the plurality of leaf data transformation components, it is verified that an instantiation of the hardware design for the leaf data transformation component generates an expected output transaction in response to each of a plurality of test input transactions. For each of the one or more parent data transformation components, it is formally verified, using a formal verification tool, that an instantiation of an abstracted hardware design for the parent data transformation component generates an expected output transaction in response to each of a plurality of test input transactions. The abstracted hardware design for the parent data transformation component represents each of the one or more child data transformation components of the parent data transformation component with a corresponding abstracted component that for a specific input transaction to (Continued)

the child data transformation component is configured to produce a specific output transaction with a causal deterministic relationship to the specific input transaction.

20 Claims, 9 Drawing Sheets

(51) Int. Cl.
*G06F 30/337* (2020.01)
*G06F 30/3323* (2020.01)
*G01R 31/3183* (2006.01)
*G01R 31/00* (2006.01)
*G06F 30/3308* (2020.01)
*G06F 115/02* (2020.01)
*G06F 119/16* (2020.01)
*G06F 111/12* (2020.01)

(52) U.S. Cl.
CPC ...... *G06F 30/3323* (2020.01); *G06F 30/3308* (2020.01); *G06F 2111/12* (2020.01); *G06F 2115/02* (2020.01); *G06F 2119/16* (2020.01)

(56) References Cited

U.S. PATENT DOCUMENTS

| | | |
|---|---|---|
| 2016/0321386 A1 | 11/2016 | Darbari et al. |
| 2017/0316116 A1 | 11/2017 | Elliott |
| 2018/0203953 A1 | 7/2018 | Morini et al. |
| 2019/0303511 A1 | 10/2019 | McKemey et al. |
| 2019/0311074 A1 | 10/2019 | Elliott |
| 2019/0311075 A1 | 10/2019 | Elliott |
| 2020/0074040 A1* | 3/2020 | Amer ............ G06F 30/30 |

OTHER PUBLICATIONS

Bensalem et al., "Compositional Verification for Component-Based Systems and Applications," International Conference on Financial Cryptography and Data Security, 2008, pp. 64-79.

Lin et al., "Interpolation Guided Compositional Verification," IEEE/ACM International Conference on Automated Software Engineering, 2015, pp. 65-74.

* cited by examiner

VERIFICATION OF HARDWARE DESIGN FOR DATA TRANSFORMATION COMPONENT

BACKGROUND

Many electronic devices, such as systems-on-chips (SoCs), include hardware (e.g. an integrated circuit) that implements a data transformation component. The term "data transformation" is used herein to mean any operation or set of operations (e.g. mathematical operations such as, but not limited to, arithmetic operations including addition, subtraction, multiplication, division etc.) that can be performed on, or applied to, a set of data to produce new data. Accordingly, a data transformation component receives a set of one or more data inputs, performs a data transformation on the set of one or more data inputs, and outputs the result of the data transformation. When a data transformation component generates a set of one or more outputs for a set of one or more inputs the component is said to execute a 'transaction'. Accordingly, a data transformation component is said to execute the same transaction if it generates a set of one or more outputs for the same set of one or more inputs.

A data transformation component may be simple (e.g. it may calculate the sum of two numbers) or it may be complex (e.g. it may be a graphics processing unit (GPU)). A data transformation component may implement the data transformation via a single data transformation stage, or a data transformation component may implement the data transformation over a plurality of data transformation stages.

Generating hardware to implement a data transformation component typically includes developing a hardware design that describes the structure and/or function of an integrated circuit that implements the data transformation component; verifying or testing the hardware design to ensure that an integrated circuit manufactured according to the design will behave as expected; and once verified, manufacturing an integrated circuit, at an integrated circuit manufacturing system, in accordance with the hardware design.

In some cases, verifying the hardware design for a data transformation component may comprise verifying that an instantiation of the hardware design will generate the correct output, according to the data transformation, for any set of inputs (i.e. for any input transaction).

A hardware design may be verified, for example, by formal verification or simulation-based verification. Formal verification is a systematic process that uses a mathematical model of the hardware design and mathematical reasoning to verify the hardware design. In contrast, simulation-based verification is a process in which a hardware design is tested by applying stimuli to an instantiation of the hardware design and monitoring the output of the instantiation of the hardware design in response to the stimuli.

In formal verification, the hardware design is transformed into a mathematical model (e.g. a state-transition system, or a flow graph) to thereby provide an instantiation of the hardware design which can be tested to verify the hardware design, and formal properties to be verified are expressed using mathematical logic using a precise syntax or a language with a precise mathematical syntax and semantics.

Formal verification is performed using a formal verification tool (i.e. a software tool that is capable of performing formal verification of a hardware design). Formal verification tools include, but are not limited to, formal property checkers such as OneSpin 360 DV™, Mentor Graphics Questa® Formal Verification, Synopsys® VC Formal, Cadence® Incisive® Enterprise Verifier, and JasperGold®; and formal equivalence checkers (which may also be referred to as formal model checkers) such as Synopsys® HECTOR, and other logical equivalence checkers (LECs) and sequential logical equivalence checkers (SLECs)).

Formal verification can improve controllability as compared to simulation-based verification. Low controllability occurs when the number of simulation test signals or vectors required to thoroughly simulate a hardware design becomes unmanageable. For example, a 32-bit comparator requires $2^{64}$ test vectors. This may take millions of years to verify exhaustively by simulation-based verification. By performing formal verification, the 32-bit comparator can be verified in less than a minute.

While formal verification can be an effective method for exhaustively verifying properties of a hardware design, this is only true if the properties that are to be verified are presented in such a manner that a formal verification tool can solve the mathematical problem presented thereby. Specifically, during formal verification of a hardware design the hardware design is represented as a mathematical model, the properties to be proved are also represented mathematically, and mathematical reasoning is used to determine if the properties are true for the hardware design based on the mathematical model. In other words, in formal verification the verification is presented as a mathematical problem to be solved. Some mathematical problems will be solvable within a reasonable amount of time by a formal verification tool whereas others will not. When a formal verification tool is able to solve the mathematical problem presented by the hardware design and the properties to be verified then the formal verification is said to converge. When, however, a formal verification tool is unable to solve the mathematical problem presented by the hardware design and the properties to be verified, then the formal verification does not converge, and no results are output, and the verification is inconclusive.

Many formal verification tools find it difficult to solve a mathematical problem presented by a hardware design and the properties to be verified that involves calculating the result of a data transformation (e.g. arithmetic operation), particularly a mathematical problem that involves calculating the result of a series or sequence of data transformations.

The embodiments described below are provided by way of example only and are not limiting of implementations which solve any or all of the disadvantages of known methods and systems for verifying a hardware design for a data transformation component.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for verifying a hardware design for a main data transformation component. The main data transformation component is representable as a hierarchical set of data transformation components which includes (i) a plurality of leaf data transformation components which do not have children, and (ii) one or more parent data transformation components which each comprise one or more child data transformation components. The method includes: (a) for each of the plurality of leaf data transformation components, verifying that an instantiation of the hardware design for the leaf data transformation component generates an expected output transaction in response to each of a plurality of test input transactions; and (b) for each of the one or more parent data transformation components, formally verifying, using a formal verification tool, that an instantiation of an abstracted hardware design for the parent data transformation component generates an expected output transaction in response to each of a plurality of test input transactions. The abstracted hardware design for the parent data transformation component represents each of the one or more child data transformation components of the parent data transformation component with a corresponding abstracted component that is configured to for a specific input transaction to the child data transformation component produce a specific output transaction with a causal deterministic relationship to the specific input transaction. During formal verification the formal verification tool is configured to select the specific input transaction and the specific output transaction pair to be each possible valid input transaction and valid output transaction pair for the child data transformation component.

A first aspect provides a computer-implemented method of verifying a hardware design for a main data transformation component, the main data transformation component being representable as a hierarchical set of data transformation components, the hierarchical set of data transformation components comprising (i) a plurality of leaf data transformation components which do not have children in the hierarchical set of data transformation components, and (ii) one or more parent data transformation components which each comprise one or more child data transformation components in the hierarchical set of data transformation components, wherein the hardware design for the main data transformation component comprises a hardware design for each data transformation component of the hierarchical set of data transformation components, the method comprising at one or more processors: for each of the plurality of leaf data transformation components, verifying that an instantiation of the hardware design for the leaf data transformation component generates an expected output transaction in response to each of a plurality of test input transactions; and for each of the one or more parent data transformation components, formally verifying, using a formal verification tool, that an instantiation of an abstracted hardware design for the parent data transformation component generates an expected output transaction in response to each of a plurality of test input transactions, wherein the abstracted hardware design for the parent data transformation component represents each of the one or more child data transformation components of the parent data transformation component with a corresponding abstracted component that is configured to for a specific input transaction to the child data transformation component produce a specific output transaction with a causal deterministic relationship to the specific input transaction, wherein during formal verification the formal verification tool is configured to select the specific input transaction and the specific output transaction pair to be each possible valid input transaction and valid output transaction pair for the child data transformation component.

The corresponding abstracted component for a child data transformation component may be defined in a formal verification language by a definition of a symbolic input transaction to the child data transformation component which specifies the specific input transaction, a definition of a symbolic output transaction of the child data transformation component which specifies the specific output transaction, and one or more constraints that establish a deterministic causal relationship between the symbolic input transaction and the symbolic output transaction.

The symbolic input transaction to the child data transformation component may be a symbolic constant that represents the valid input transactions to the child data transformation component.

The symbolic output transaction to the child data transformation component may be a symbolic constant that represents the valid output transactions for the child data transformation component.

The one or more constraints may be implemented by one or more formal assumption statements.

When a parent data transformation component comprises a plurality of child data transformation components the abstracted hardware design for that parent data transformation component may comprise a description of a relationship between the symbolic input and output transactions of the plurality of child data transformation components.

Each data transformation component of the hierarchical set of data transformation components may be configured to receive one or more data inputs, perform a data transformation on the one or more data inputs, and output a result of the data transformation.

Verifying that an instantiation of the hardware design for a leaf data transformation component generates an expected output transaction in response to an input transaction may comprise verifying that the instantiation of the hardware design for the leaf data transformation component generates an output transaction, with a deterministic causal relationship to the input transaction, that is correct with respect to a data transformation to be performed by the leaf data transformation component.

Verifying that an instantiation of the abstracted hardware design for a parent data transformation component generates an expected output transaction in response to an input transaction may comprise verifying that an instantiation of the abstracted hardware design for the parent data transformation component generates an output transaction, with a deterministic causal relationship to the input transaction, that has been generated by processing the input transaction through an expected combination of the one or more child data transformation components of that parent data transformation component.

The plurality of test input transactions for a leaf data transformation component may comprise all valid input transactions to the leaf data transformation component.

The plurality of test input transactions for a parent data transformation component may comprise all valid input transactions to the parent data transformation component.

Verifying that an instantiation of the hardware design for a leaf data transformation component generates an expected output transaction in response to each of a plurality of test input transactions may comprise formally verifying, using a formal verification tool, that an instantiation of the hardware design for the leaf data transformation component generates an expected output transaction in response to each of the plurality of test input transactions.

The method may further comprise outputting one or more control signals indicating whether each of the verifications was successful.

The method may further comprise, in response to determining that at least one of the verifications was not successful, determining whether the at least one of the verifications that was not successful was inconclusive; and in response to determining that the at least one of the verifications that was not successful was inconclusive, representing the main data transformation component using a different hierarchical set of data transformation components, and repeating the verifications for at least a portion of the data transformation components of the different hierarchical set of data transformation components.

The method may further comprise, in response to determining that the verification of the hardware design for a leaf data transformation component was inconclusive, converting that leaf data transformation component into a parent data transformation component that comprises a plurality of leaf data transformation components to form the different hierarchical set of data transformation components, and verifying the hardware design for each of the plurality of child data transformation components of that parent data transformation component and verifying an abstracted hardware design for that parent data transformation component.

The method may further comprise, in response to determining that the at least one verification that was not successful was not inconclusive, modifying the hardware design for the main data transformation component to generate a modified hardware design for the main data transformation component.

The method may further comprise, in response to determining that the verifications were successful, manufacturing, using an integrated circuit manufacturing system, an integrated circuit embodying the main data transformation component according to the hardware design.

When processed at an integrated circuit manufacturing system, the hardware design for the main data transformation component may configure the integrated circuit manufacturing system to manufacture an integrated circuit embodying the main data transformation component.

A second aspect provides a system for verifying a hardware design for a main data transformation component, the main data transformation component being representable as a hierarchical set of data transformation components, the hierarchical set of data transformation components comprising (i) a plurality of leaf data transformation components which do not have children in the hierarchical set of data transformation components, and (ii) one or more parent data transformation components which each comprise one or more child data transformation components in the hierarchical set of data transformation components, wherein the hardware design for the main data transformation component comprises a hardware design for each data transformation component of the hierarchical set of data transformation components, the system comprising: memory configured to store: the hardware design for each of the plurality of leaf data transformation components; an abstracted hardware design for each of the one or more parent data transformation components, wherein the abstracted hardware design for a parent data transformation component represents each of the one or more child data transformation components of the parent data transformation component with a corresponding abstracted component that is configured to for a specific input transaction to the child data transformation component produce a specific output transaction with a causal deterministic relationship to the specific input transaction, wherein during formal verification of the abstracted hardware design for a child data transformation component a formal verification tool is configured to select the specific input transaction and the specific output transaction pair to be each possible valid input transaction and valid output transaction pair for the child data transformation component; and one or more verification tools comprising one or more formal verification tools; and one or more processors configured to: cause at least one of the one or more verification tools to verify that an instantiation of the hardware design for each of the plurality of leaf data transformation components produces an expected output transaction in response to each of a plurality of test input transactions; and cause at least one of the one or more formal verification tools to formally verify that an instantiation of the abstracted hardware design for each of the one or more parent data transformation components produces an expected output transaction in response to each of a plurality of test input transactions.

A hardware design for a data transformation component, when processed in an integrated circuit manufacturing system, configures the system to manufacture an integrated circuit embodying the data transformation component. There may be provided a non-transitory computer readable storage medium having stored thereon a hardware design for a data transformation component that, when processed in an integrated circuit manufacturing system, causes the integrated circuit manufacturing system to manufacture an integrated circuit embodying the data transformation component.

There may be provided an integrated circuit manufacturing system comprising: a non-transitory computer readable storage medium having stored thereon a hardware design for a data transformation component; a layout processing system configured to process the computer readable description so as to generate a circuit layout description of an integrated circuit embodying the data transformation component; and an integrated circuit generation system configured to manufacture an integrated circuit embodying the data transformation component according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
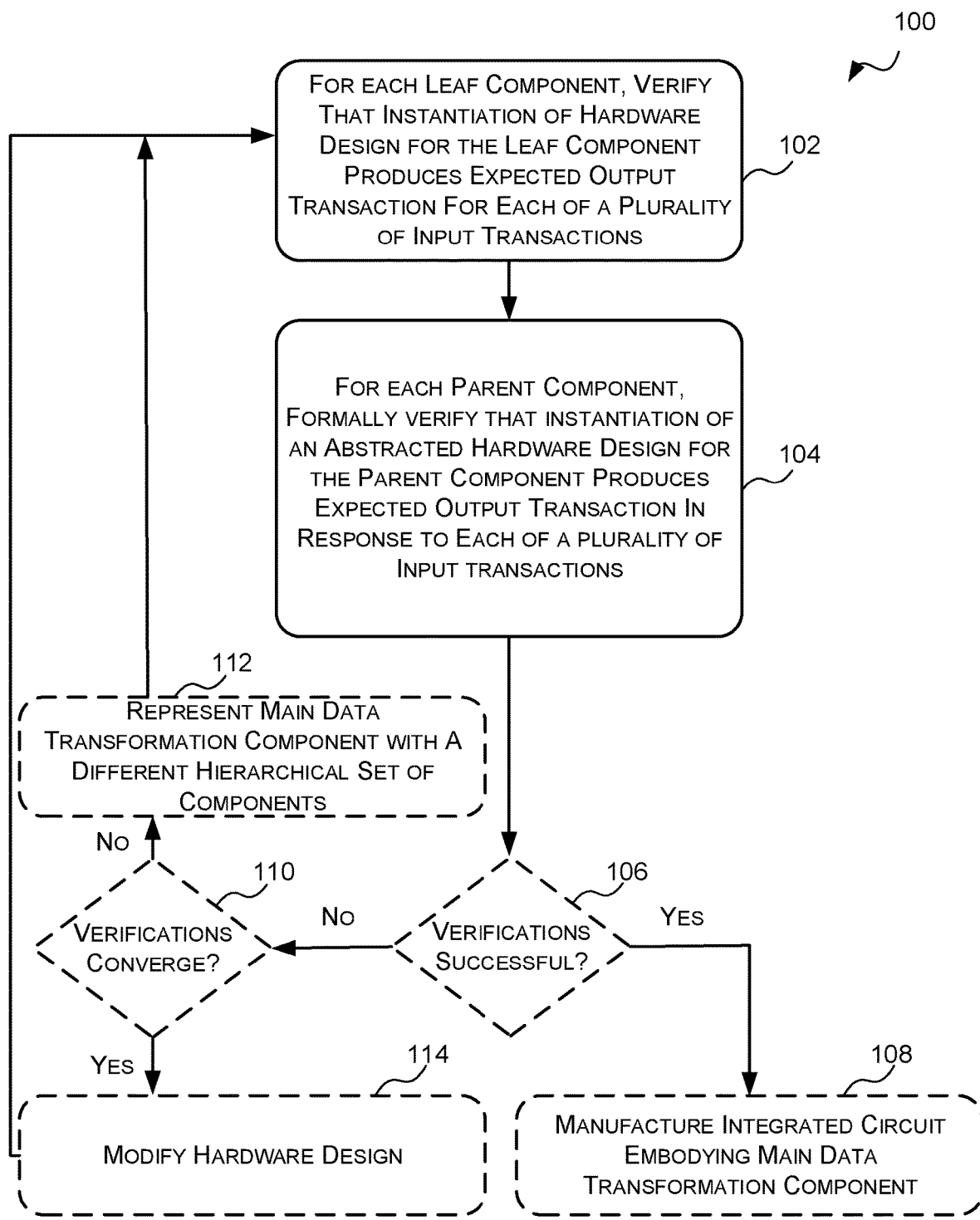
FIG. 1 is a flow diagram of an example method of verifying a hardware design for a data transformation component.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A "hardware design" is a description of the structure and/or function of an integrated circuit which, when processed at an integrated circuit manufacturing system, causes the integrated circuit manufacturing system to generate an integrated circuit described by the hardware design. For example, as described in more detail below with respect to FIG. 9, when a hardware design is processed at an integrated circuit manufacturing system the integrated circuit manufacturing system may generate the integrated circuit by synthesizing the hardware design into silicon, or, by loading configuration data into a field-programmable gate array (FPGA).

A hardware design may be implemented in a high-level hardware description language (HDL), such as, but not limited to, a register transfer level (RTL) language. Examples of register transfer level languages include, but are not limited to, VHDL (VHSIC Hardware Description Language) and Verilog®. It will be evident to a person of skill in the art that other high-level hardware description languages may be used such as proprietary high-level hardware description languages.

An "instantiation of a hardware design" is a representation of the hardware and/or functionality of the hardware defined by the hardware design. An instantiation of a hardware design includes, but is not limited to, an emulation model of the hardware design that mimics or reproduces the behaviour of the hardware defined by the hardware design, a synthesized version (e.g. netlist) of the hardware design, a hardware implementation (e.g. integrated circuit or a field-programmable gate array (FPGA)) of the hardware design, and a mathematical model of the hardware design generated by a formal verification tool. An instantiation of the hardware design embodies the hardware design in a form which can be tested to verify the hardware design.

A hardware design for a data transformation component is thus a description of the structure and/or function of an integrated circuit to implement a data transformation component which, when processed at an integrated circuit manufacturing system, causes the integrated circuit manufacturing system to generate an integrated circuit that embodies the data transformation component. As described above, a data transformation component is configured to receive one or more data inputs, perform a data transformation (e.g. perform one or more arithmetic operations) on the one or more data inputs, and output the result of the data transformation. Accordingly, a hardware design for a data transformation component includes a description of the structure and/or function of the data transformation performed on the one or more data inputs. As described above, a data transformation component may perform the data transformation via one data transformation stage or via multiple data transformation stages.

As described above, many formal verification tools have difficulty in solving mathematical problems defined by a hardware design and properties to be verified that involve calculating the result of a data transformation, and, particularly, calculating the result of a sequence or set of data transformations. Accordingly, described herein are hierarchical methods and systems for verifying, via formal verification, a hardware design for a main data transformation component (which may alternatively be referred to herein as the hardware design under test). Specifically, in the methods and systems described herein the main data transformation component is described, or represented, as a hierarchical set of data transformation components. The hierarchical set of data transformation components comprises (i) a plurality of leaf data transformation components; and (ii) one or more parent data transformation components. A leaf data transformation component is a data transformation component that does not have any children in the hierarchy. In contrast, a parent data transformation component comprises one or more child data transformation components. The child data transformation component of a parent data transformation component may be a leaf data transformation component or another parent data transformation component. Accordingly, a parent data transformation can be both a child data transformation component and a parent data transformation component.

The data transformation components of the hierarchical set of data transformation components can be grouped into a number of levels, wherein the level of a data transformation component is based on the number of ancestors the data transformation component has in the hierarchy. In some cases, the level of a data transformation component may be 1+ the number of ancestors in the hierarchy. For example, a data transformation at the root (i.e. top) of the hierarchy has no ancestors and thus is a level 1 data transformation component. The children data transformation components of the root data transformation component have one ancestor (the root data transformation component) thus they are level 2 data transformation components. The children of a level 2 data transformation component (i.e. the grandchildren of the root data transformation component) have two ancestors—a level 2 data transformation component and the root data transformation component, thus they are level 3 data transformation components. The closer a data transformation component is to the root data transformation component, the higher the level of that data transformation component. Accordingly, the root data transformation component is at the highest level of the hierarchy, and a child data transformation component is always at a lower level of the hierarchy than its parent data transformation component. In general, different leaf data transformation components may have a different number of ancestors. Accordingly, the leaf data transformation components may not all be at the same level within the hierarchy.

At least a portion of the hardware design for the main data transformation component corresponds to each data transformation component in the hierarchy. The portion of the hardware design that relates to, or describes, a data transformation component in the hierarchy may be referred to herein as the hardware design for that data transformation component. In other words, the hardware design for the main data transformation component comprises a hardware design for each data transformation component in the hierarchy.

In some cases, as described in more detail below, the hierarchical set of data transformation components that are used to represent the main data transformation component may vary during the verification. For example, if the verification(s) performed using a first hierarchical set of data transformation components do not converge or are inconclusive, the main data transformation component may be represented by a second, different, hierarchical set of data transformation components and the verification(s) may then be performed for at least a portion of the data transformation components in the second hierarchical set of data transformation components.

The hardware design for the main data transformation component is verified by verifying the hardware designs for each data transformation component in the hierarchy separately. This allows the mathematical problem of verifying the hardware design to be divided into manageable pieces. However, the data transformation components at higher levels in the hierarchy get more and more complicated as they encompass more and more lower level data transformation components. Accordingly, to simplify the verification of the hardware design for a parent data transformation component, the description of each child data transformation component in that hardware design is replaced with a description of an abstracted component (e.g. a formal description of the abstracted component written in a formal verification language) to generate an abstracted hardware design for the parent data transformation component. The description of the child data transformation component can be abstracted because the child data transformation component itself will be verified.

For example, when verifying the hardware design for the parent data transformation of a leaf data transformation component, the description of the leaf data transformation component can be replaced with a description (e.g. a formal description) of a corresponding abstracted component in the hardware design for the parent data transformation component. In the examples described herein the abstracted component is configured to, for a specific input transaction to the data transformation component that it replaces, generate a specific output transaction at the appropriate time according to the specification for the data transformation component, wherein the specific input transaction and the specific output transaction are dynamically selected by a formal verification tool from a set of possible input transactions and a set of possible output transactions respectively. During formal verification the formal verification tool is configured to select the specific input transaction and the specific output transaction pair to be each possible input transaction and output transaction pair. In this way the complex data transformation logic that formal verification tools find difficult to deal with is removed from the hardware designs of all but the leaf data transformation components.

Although the example verification methods and systems described below are described for use in verifying a hardware design for a data transformation component, the methods and systems described herein may be used to verify the hardware design for any component that can be represented as, or described by, a hierarchical set of components. It is noted that the described methods and systems have proven particularly useful in verifying complex components, such as GPUs.

Reference is now made to FIG. 1 which illustrates an example hierarchical method 100 for verifying a hardware design for a main data transformation component. The method 100 may be implemented by a computing-based device such as, but not limited to, the computing-based device 700 described below with respect to FIG. 7. For example, there may be a computer readable storage medium having stored thereon computer readable instructions that, when executed at a computing-based device, cause the computing-based device to perform the method 100 of FIG. 1.

In the examples described herein the main data transformation component can be represented by, or described as, a hierarchical set of data transformation components. The hierarchical set of data transformation components comprises a plurality of levels of data transformation components. The plurality of levels of data transformation components comprises a plurality of leaf data transformation components, and one or more parent data transformation components. Each parent data transformation component comprises at least one data transformation component of the next lower level (which may be referred to herein as the child data transformation component of that parent data transformation component). The hierarch (i.e. root) component of the hierarchy (i.e. the component at the highest level of the hierarchy) is the main data transformation component itself.

At least a portion of the hardware design for the main data transformation component corresponds to each data transformation component in the hierarchy. The portion of the hardware design for the main data transformation component that relates to, or describes, a data transformation component in the hierarchy may be referred to herein as the hardware design for that data transformation component. In some cases, the hardware design for the main data transformation component may be implemented in a hierarchical manner such that the portions of the hardware design pertaining to each data transformation component in the hierarchy are easily discernible. In other cases, the method 100 may further comprise describing, or representing, the main data transformation component as a hierarchical set of data transformation components and identifying the portion of the hardware design for the main data transformation component that relates to each data transformation component in the hierarchy.

Figure 2:
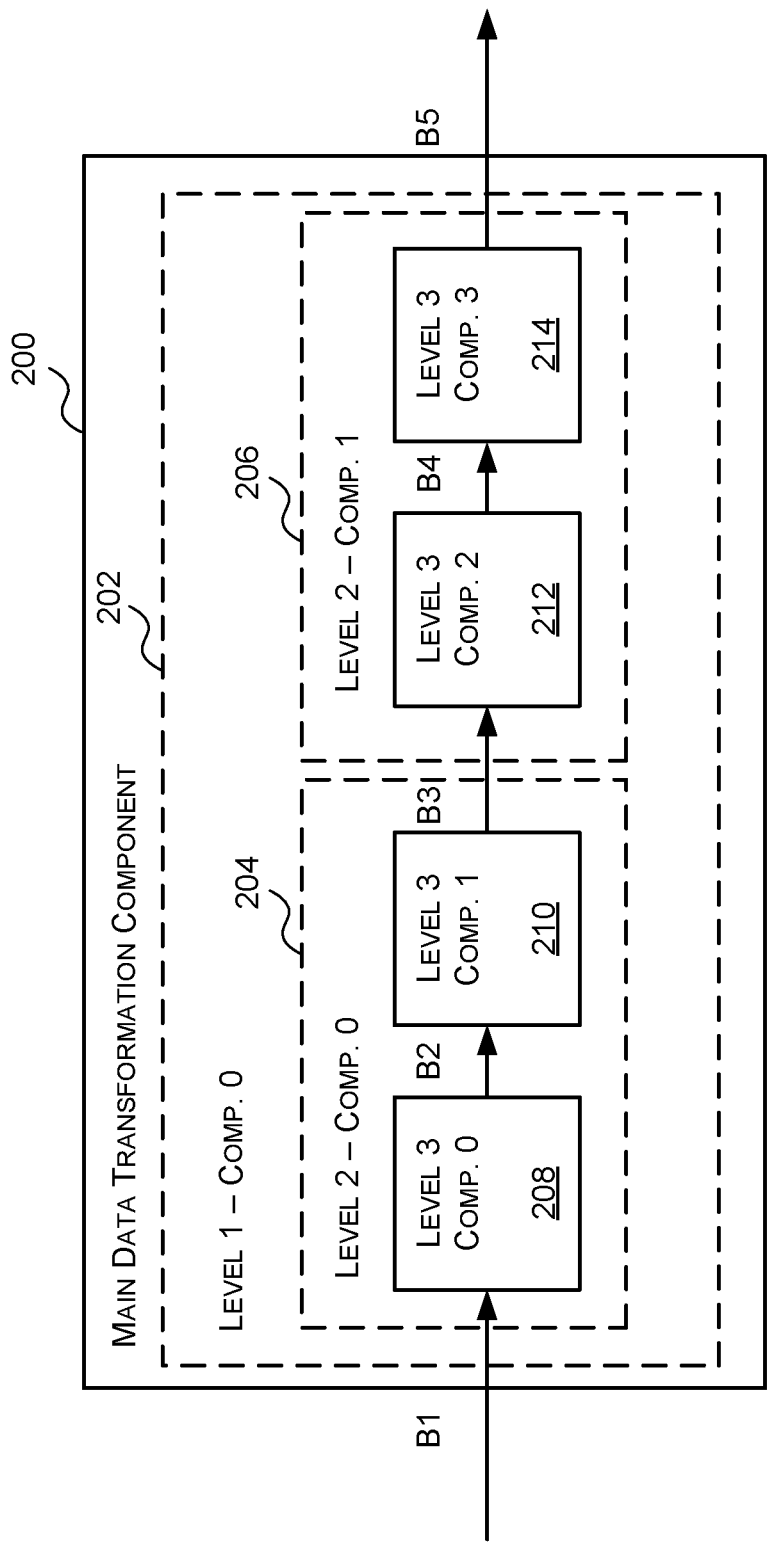
FIG. 2 is a block diagram of an example main data transformation component that is representable as a hierarchal set of data transformation components.

FIG. 2 shows an example data transformation component 200 which is represented by a hierarchical set of data transformation components 202, 204, 206, 208, 210, 212, 214. Each data transformation component receives a set of one or more inputs (i.e. an input transaction), performs a data transformation on the set of one or more inputs, and outputs the result(s) of the data transformation (i.e. an output transaction). For example, one data transformation component (e.g. 208) may add two input values, whereas another data transformation component (e.g. 210) may calculate the square root of an input value. Although FIG. 2 shows only the data transformation components of the main data transformation component 200 it will be evident to a person of skill in the art that the main data transformation component 200 may comprise other components, such as, but not limited to, control logic and registers.

In the example of FIG. 2 the hierarchical set of data transformation components comprises three levels of data transformation components numbered 1 to 3 wherein level 1 is the highest level. There is a single data transformation component 202 at the top level (level 1) which represents the main data transformation component. The level 1 data transformation component 202 comprises two level 2 data transformation components 204, 206. Each level 2 data transformation component 204 and 206 comprises two level 3 data transformation components. Specifically, the first level 2 data transformation component 204 comprises the first and second level 3 data transformation components 208 and 210, and the second level 2 data transformation component 206 comprises the third and fourth level 3 data transformation components 212 and 214.

The lower level data transformation components that form part of a higher level data transformation component may be referred to as the subordinate data transformation components, or the child data transformation components, of that higher level component. For example, the first and second level 3 components 208 and 210 are subordinates or children of the first level 2 data transformation component 204. Similarly, the higher level data transformation component which incorporates a lower level data transformation component is referred to as the superior or parent of that lower level data transformation component. For example, the first level 2 data transformation component 204 is a superior, or a parent, of the first and second level 3 data transformation components 208 and 210.

The data transformation components that do not comprise another data transformation component (i.e. do not have any children) are referred to as leaf data transformation components. For example, the level 3 data transformation components 208, 210, 212 and 214 do not comprise any other data transformation components and thus are leaf data transformation components. Although all of the leaf data transformation components are shown in FIG. 2 as being at the same level, in other examples, the leaf data transformation components may be at different levels of the hierarchy.

In the methods described herein the hardware design for each data transformation component in the hierarchy is verified separately and the verification of a parent data transformation component is simplified by replacing the description of any child data transformation component in the hardware design for the parent data transformation component with a description of an abstracted component. Specifically, as described in more detail below, in some cases the logic that implements or performs the data transformation of that child data transformation component is replaced with logic that for a specific input transaction produces a specific output transaction at the correct time (according to the specification for that data transformation component), wherein the specific input transaction and the specific output transaction are dynamically selected by a formal verification tool from a set of possible input transactions and a set of possible output transactions respectively. The set of possible input transactions from which the specific input transaction is selected may be all valid input transactions. The set of possible output transactions from which the specific output transaction is selected may be all valid output transactions. During formal verification, the formal verification tool is configured to select the specific input and output transaction pair to be each possible input and output transaction pair. This allows the specifics of the data transformation(s) to be removed from the hardware designs of all but the leaf data transformation components, yet the interactions between the components to be verified.

Figure 3:
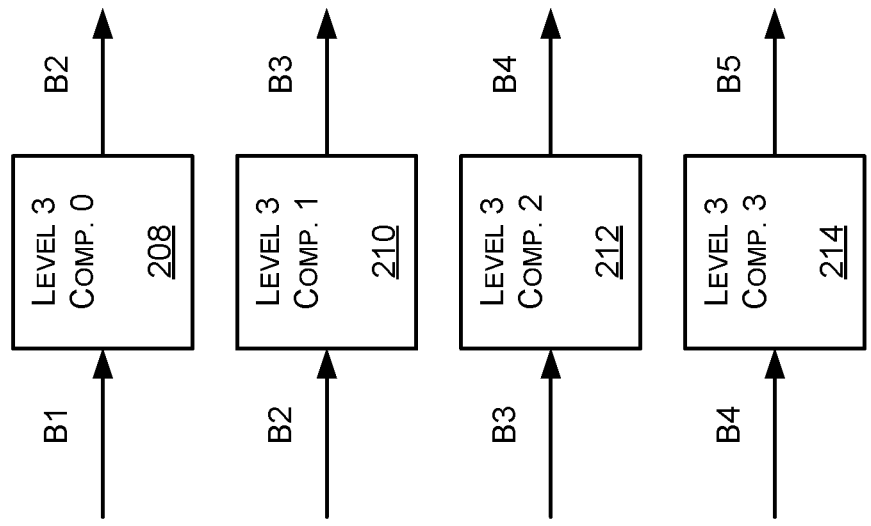
FIG. 3 is a schematic diagram illustrating the verifications that are performed in block 102 of the method of FIG. 1 for a hardware design for the main data transformation component of FIG. 2.

The method 100 begins at block 102, where the hardware design for each leaf data transformation component is verified to ensure that an instantiation of the hardware design for the leaf data transformation component will work as expected. For example, for the example main data transformation component 200 of FIG. 2 the hardware design for each level 3 data transformation component 208, 210, 212, 214 is verified as shown in FIG. 3. Verifying that a hardware design for a leaf data transformation component will work as expected may comprise formally verifying that an instantiation of the hardware design for the leaf data transformation component generates an expected output transaction in response to each of a plurality of input transactions. The plurality of input transactions may comprise all valid input transactions for the leaf data transformation component.

In some cases, formally verifying that an instantiation of the hardware design for a leaf data transformation component will work as expected may comprise formally verifying that an instantiation of the hardware design always produces the 'correct' output, with respect to the data transformation that the leaf data transformation component is configured to perform, in response to each valid input transaction. In these cases, the expected output transaction for an input transaction is the 'correct' or expected result of the data transformation for the input transaction. For example, if a leaf data transformation component is designed to calculate the sum of two inputs a and b then the expected output for any input transaction may be the sum of the two inputs (i.e. a+b).

In other cases, formally verifying that an instantiation of the hardware design for a leaf data transformation component will work as expected may comprise formally verifying that an instantiation of the hardware design is consistent (i.e. that it will always produce the same output transaction in response to the same input transaction regardless of when the input transaction is processed by the instantiation of the hardware design for the leaf data transformation component). For example, if a leaf data transformation component is designed to calculate the sum of two inputs a and b then the leaf data transformation component may receive a particular a and b pair (e.g. a=5 and b=6) as inputs at cycle 0 and it may receive the same a and b pair (e.g. a=5 and b=6) again in cycle 10. The leaf data transformation component is 'consistent' if it produces the same output in response to each matching a and b pair (e.g. each a=5 and b=6). Accordingly, in these cases the expected output transaction is the same output transaction that the instantiation produced the first time it processed that input transaction, not necessarily the 'correct' output transaction with respect to the data transformation component that the leaf data transformation component is configured/designed to perform.

Regardless of whether it is verified that the output is 'correct' or the output is 'consistent'; to verify that the output transaction produced in response to an input transaction is the expected output transaction, the verifier has to know when the output transaction corresponding to a particular input transaction is to be output. This is based on the specification for the leaf data transformation component. Accordingly, verifying that an expected output transaction is generated in response to an input transaction also verifies that the output transaction is produced or output at the correct time(s) (e.g. the output transaction may comprise outputs that are produced over a plurality of cycles). In other words, verifying that an instantiation of hardware design generated an expected output transaction in response to an input transaction also verifies that the output transaction has the expected causal relationship to the input transaction. As described in more detail below, this means that when verifying the parent data transformation component of a leaf data transformation component it can be assumed that the leaf data transformation component will, for any of the verified input transactions, generate an output transaction with the expected causal relationship to the input transaction.

Formally verifying that an instantiation of the hardware design for a leaf data transformation component generates an expected output transaction in response to each of a plurality of input transactions may comprise generating a test bench in a formal verification language, such as, but not limited to SVA, comprising one or more assertions to be verified and optionally one or more constraints (e.g. assumptions) and/or modelling logic; linking the test bench to the hardware design for the leaf data transformation component; and formally verifying, using a formal verification tool, that the one or more assertions are true (or hold) for the hardware design for the leaf data transformation component, and outputting one or more signals indicating whether the one or more assertions were successfully verified.

An assertion is a statement that a particular property is expected to hold for a hardware design (i.e. is always true). An assertion of the form "assert property [evaluable expression]" is said to "assert" the property specified by the "evaluable expression". If an asserted property (e.g. the evaluable expression) is evaluated to be false for the hardware design for any valid input the hardware design is not behaving as expected and there is an error. For example, in the example assertion "assert property a=b"; if a is not equal to b at any point then the hardware design is not behaving as expected and there is an error.

Assertions are used to capture required temporal and combinational behaviour of the hardware design in a formal and unambiguous way. The hardware design can then be verified to determine that it conforms to the requirement as captured by the assertion(s). Since assertions capture the hardware design behaviour on a cycle-by-cycle basis they can be used to verify intermediate behaviours.

Assertions are typically expressed in an assertion language. An assertion language, which may also be referred to as a property language or a formal verification language, captures the hardware design behaviour spread across multiple hardware design cycles (e.g. clock cycles) in a concise, unambiguous manner. While traditional hardware description languages (HDL), such as an RTL language, have the ability to capture individual cycle behaviour, they are too detailed to describe properties at a higher level. In particular, assertion languages provide means to express temporal relationships and complex hardware design behaviours in a concise manner. Assertion languages include, but are not limited to, System Verilog Assertions (SVA), Property Specification Language (PSL), Incisive Assertion Library (IAL), Synopsys OVA (OpenVera Assertions), Symbolic Trajectory Evaluation (STE), SystemC Verification (SCV), 0-In, Specman, and OpenVera Library (OVL).

The hierarchy of data transformation components may be designed or configured such that the leaf data transformation components are relatively simple data transformation components and/or perform relatively simple data transformations. Example methods of verifying the correctness or consistency of a data transformation component using one or more assertions are described in the Applicant's co-pending UK Patent Application Nos. 1805722.4, 1805723.2, 1818105.7 and 1818108.1, which are herein incorporated by reference in their entirety.

The test bench (including the one or more assertions) may be linked to the hardware design for the leaf data transformation component by incorporating the test bench into the hardware design for the leaf data transformation component or binding the test bench to the hardware design for the leaf data transformation component. Specifically, the test bench may be bound to the relevant signals of the hardware design for the leaf data transformation component to determine when the instantiation has received one of the relevant input transactions, and to determine whether the output transaction is as expected.

Once the test bench has been linked to the hardware design for the leaf data transformation component, the hardware design for the leaf data transformation component, the test bench, and the bindings are loaded into a formal verification tool and the formal verification tool is configured to verify that the one or more assertions are true for the hardware design for the leaf data transformation component.

An assertion is verified by searching the entire reachable state space of the instantiation of the hardware design (e.g. state-transition system, or flow graph) without explicitly traversing all the states. The search is done by, for example, encoding the states using efficient Boolean encodings using Binary decision diagrams (BDDS), or using advanced SAT (satisfiability-based bounded model checking) based techniques. In some cases, tools can be used to implement techniques, such as, but not limited to, abstraction, symmetry, symbolic indexing, and invariants to improve performance and achieve scalability. Since formal verification of a property algorithmically and exhaustively explores all valid input values over time, verifying a property in this manner allows a property to be exhaustively proved or disproved for all valid states.

Once the leaf data transformation components have been verified the method 100 proceeds to block 104.

At block 104, the hardware design for each parent data transformation component is verified. Verifying each parent data transformation component may comprise (i) replacing, in the hardware design for the parent data transformation component, the description of each child data transformation component thereof with a description of a corresponding abstracted component, to generate an abstracted hardware design for the parent data transformation component; and (ii) formally verifying that an instantiation of the abstracted hardware design for the parent data transformation component generates an expected output transaction in response to each of a plurality of test input transactions. In some cases, the plurality of test input transactions may be the set of all valid input transactions to the parent data transformation component.

As described above, the expected output in the verifications performed in block 102 is the expected or correct result of the data transformation performed by the leaf data transformation component (if verifying correctness); or is the same output generated the first time that input transaction was processed by the instantiation of the data transformation component (if verifying consistency). However, in block 104 the logic performing the data transformation(s) has been removed in the abstracted hardware designs so the expected output in the verifications performed in block 104 is an output that has been generated by processing the input transaction by an expected set of child data transformation components thereof. Accordingly, in block 104 it is verified that for each of the plurality of input transactions that an instantiation of the abstracted hardware design produces an output at the correct, or expected time, and that the output has been generated by processing the input transaction at the expected set of child data transformation components. For example, if the parent data transformation component comprises a first child data transformation component that is configured to calculate the sum c of two inputs a and b, and a second child data transformation component that is configured to calculate the product of d of c and 4 then in block 104 it may be verified that for any input pair a and b the output d, appears at the correct or expected time, and that d was generated by processing a and b at the first child data transformation component and then at the second child data transformation component.

For example, for the example main data transformation component 200 of FIG. 2 there are three parent data transformation components—the two level 2 data transformation components 204, 206 and the one level 1 data transformation component 202. Therefore executing block 104 for the main data transformation component 200 of FIG. 2 comprises verifying the hardware design for each level 2 data transformation component 204, 206 and verifying the hardware design for the level 1 data transformation component 202.

Figure 4:
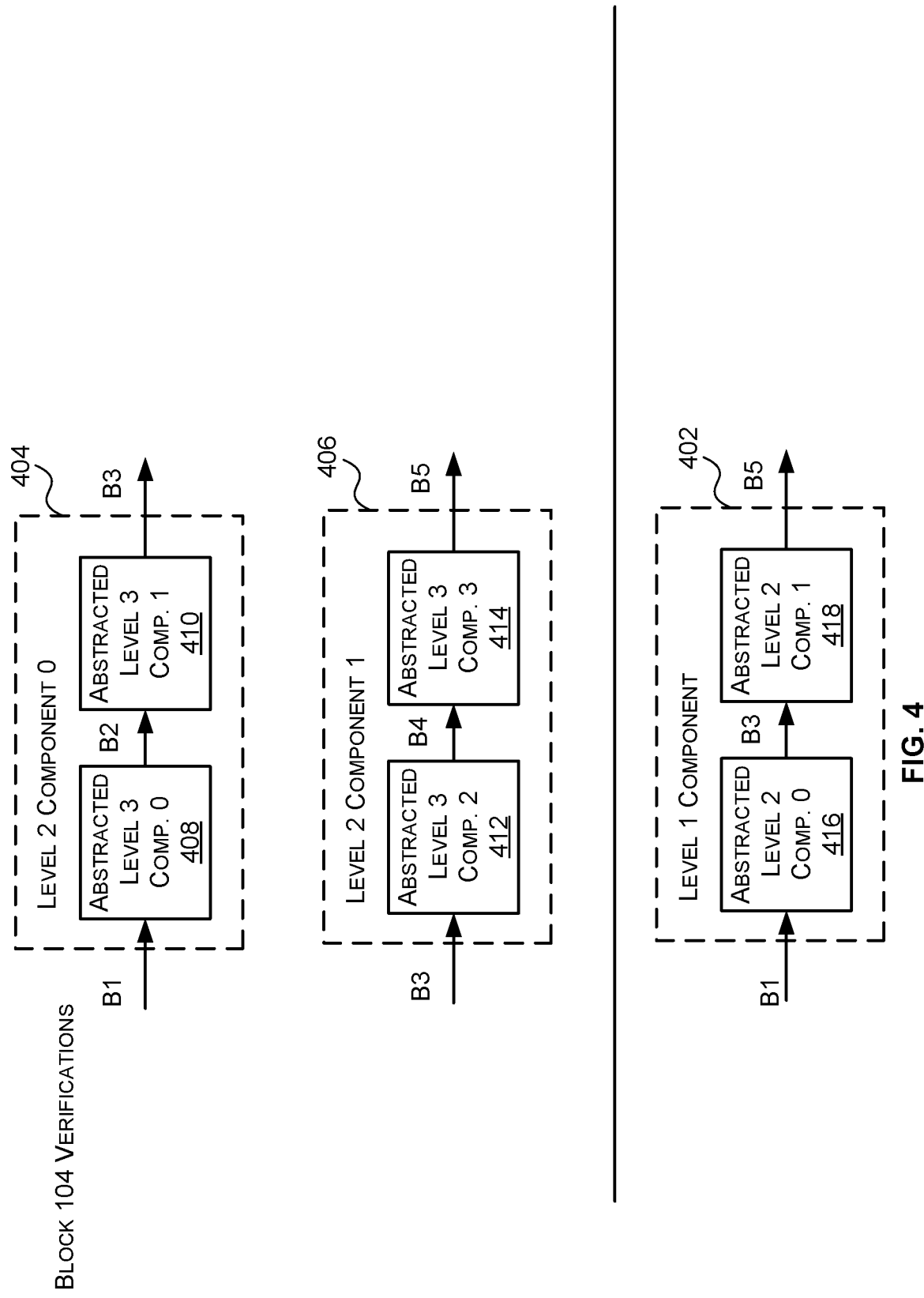
FIG. 4 is a schematic diagram illustrating the verifications that are performed in block 104 of the method of FIG. 1 for a hardware design for the main data transformation component of FIG. 2.

This comprises generating an abstracted hardware design for each level 2 data transformation component 204, 206 in which the description of each level 3 data transformation component therein is replaced with a description of a corresponding abstracted component. For example, as shown in FIG. 4, an abstracted hardware design 404 for the first level 2 data transformation component 204 of FIG. 2 may be generated by replacing the description of the first level 3 data transformation component 208 in the hardware design with a description of a corresponding abstracted component 408, and replacing the description of the second level 3 data transformation component 210 in the hardware design with a description of a corresponding abstracted component 410. Similarly, an abstracted hardware design 406 for the second level 2 data transformation component 206 may be generated by replacing the description of the third level 3 data transformation component 212 in the hardware design with a description of a corresponding abstracted component 412, and replacing the description of the fourth level 3 data transformation component 214 with a description of a corresponding abstracted component 414.

It is then formally verified that (a) an instantiation of the abstracted hardware design for the first level 2 component 404 generates an expected output transaction in response to each of a plurality of input transactions; and (b) an instantiation of the abstracted hardware design for the second level 2 component 406 generates an expected output transaction in response to each of a plurality of input transactions.

Then an abstracted hardware design for the level 1 data transformation component 202 is generated in which each level 2 data transformation component therein is replaced with a description of an abstracted component. For example, as shown in FIG. 4 an abstracted hardware design 402 for the level 1 component 202 of FIG. 2 may be generated by replacing the description of the first level 2 component 204 in the hardware design with a description of a corresponding abstracted component 416, and replacing the description of the second level 2 component 206 in the hardware design with a description of a corresponding abstracted component 418.

It is then formally verified that an instantiation of the abstracted hardware design for the level 1 data transformation component 402 generates an expected output transaction in response to each of a plurality of input transactions.

In the examples described herein, the abstracted component that replaces a child data transformation component is configured to, for a specific input transaction for the child data transformation component, produce a specific output transaction with a deterministic causal relationship thereto (e.g. at the correct time) according to the specification for that child data transformation component, wherein the specific input transaction and the specific output transaction are dynamically selected by a formal verification tool from a plurality of possible input transactions and a plurality of possible output transactions respectively. During formal verification, the formal verification tool is configured to select the specific input and output transaction pair to be each possible input and output transaction pair. In some cases, the plurality of possible input transaction may be all valid input transactions for the child data transformation component. In some cases, the plurality of possible output transactions may be all valid output transactions for the child data transformation component. It is noted that the specific output transaction does not have to be the correct output transaction for the specific input transaction. For example, if the data transformation component is configured to calculate the square root of an input, then if the specific input transaction is 25 the specific output transaction does not have to be 5, it can be any valid output value.

A child data transformation component can be abstracted in this manner because it has been verified in block 102 or block 104 that an instantiation of the hardware design of the child data transformation component will work as expected. In general, a property of a child data transformation component that has been proven (or will be proven) to be true can be assumed to be true in verifications of the parent data transformation components of that child data transformation component. As is known to those of skill in the art, the specification for a component defines the requirements or properties of that component. How the requirements or properties set out in the specification are implemented in the component is up to the architect, engineer or hardware designer who designs the component.

Figure 5:
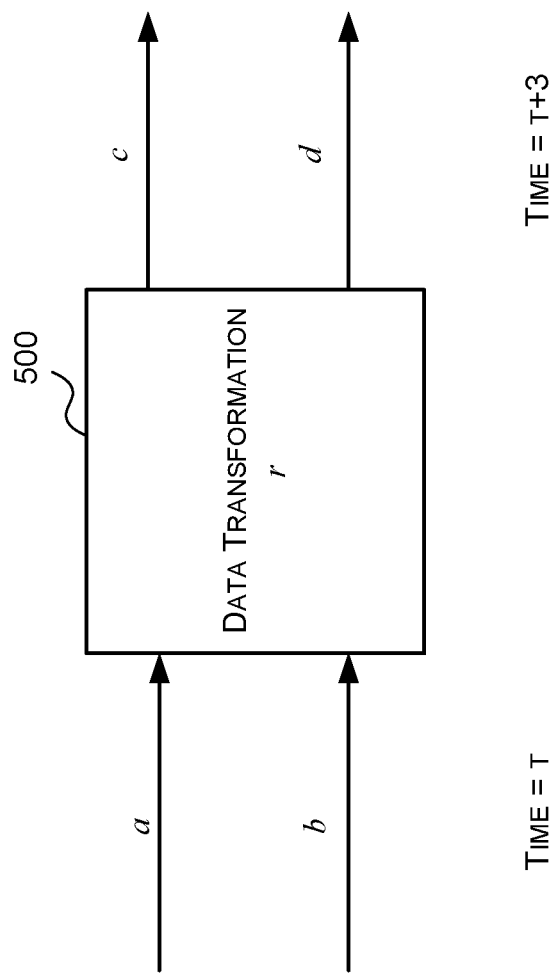
FIG. 5 is a schematic diagram illustrating an example data transformation component that is to be abstracted.

An 'input transaction' for a component is the set of one or more inputs that are taken into account in generating the output for the component. In other words, an 'input transaction' for a component comprises the set of one or more inputs which influence the output of the component. Examples of other inputs that may not influence the output of the component include, but are not limited to, control signals. The inputs forming an input transaction may be received by the component in the same cycle or received by the component over several cycles. For example, a first input of an input transaction may be received in one cycle and a second input of the input transaction may be received in the next cycle. FIG. 5 illustrates an example data transformation component 500 which receives two inputs a and b, performs a data transformation r on a and b to produce c and d, and outputs c and d three cycles after a and b are received. An input transaction for the example component 500 of FIG. 5 may comprise an a and b pair received in the same cycle.

Similarly an 'output transaction' for a component is the set of one or more outputs that are generated in response to an input transaction. The outputs forming an output transaction may be output by the component in the same cycle or different cycles. For example, a first output of an output transaction may be output in one cycle and a second output of an output transaction may be output in the next cycle. For example, an output transaction for the example component 500 of FIG. 5 may be a c and d pair. The specific manner in which the output transaction is calculated from the input transaction is not specified in the abstracted component.

Since a data transformation component generates output data that is a transformed version of the corresponding input data, the output data corresponding to particular input data may be different than the input data. Accordingly, the abstracted component typically has a mechanism to relate input transactions to their corresponding output transaction. For example, the abstracted component may implement a sideband ID that is attached to the input data. The sideband ID may then be output along with the corresponding output data to relate input data and output data. In other cases, the abstracted component may be configured to relate input data to its corresponding output data via a first-in-first-out mechanism. For example, an abstracted component may be configured to keep track of the number of inputs and the number of outputs and relate inputs to outputs based on the counter. It will be evident to a person of skill in the art that these are examples only, and that the abstracted components may implement other suitable mechanisms for relating inputs to outputs.

Replacing the example data transformation component 500 of FIG. 5 with an abstracted component that is configured to, for a specific input transaction, produce a specific output transaction with a deterministic relationship thereto (e.g. at the correct time) wherein the particular input transaction is dynamically selected from a set of possible input transactions and the particular output transaction is dynamically selected from a set of possible output transactions, may comprise replacing this component with a component that is configured to, when it receives a particular set of a and b (i.e. particular input transaction), output a particular set of c and d (i.e. particular output transaction) three cycles after a and b are received, wherein the particular set of a and b is selectable from all possible combinations of a and b and the particular set of c and d is selectable from all possible combinations of c and d.

In some cases, the description of a child data transformation component in a hardware design for a parent data transformation component may be replaced with a description of an abstracted component that is configured to, for a specific input transaction, produce a specific output transaction at the correct time wherein the specific input and output transactions are dynamically selected from a set of possible input transactions and a set of possible output transactions respectively, by replacing the description of the child data transformation component in the hardware design for the parent data transformation component with: (a) a formal definition of a symbolic input transaction for the child data transformation component; (b) a formal definition of a symbolic output transaction for the child data transformation component; and (c) one or more formal constraints that link the symbolic input transaction to the symbolic output transaction in a deterministic manner so that the symbolic output transaction is produced (i.e. output) at the correct time. In other words, the one or more formal constraints create a deterministic causal relationship between the symbolic input transaction and the symbolic output transaction. The replacement of the description of a data transformation component with a symbolic input transaction, a symbolic output transaction and a set of one or more constraints defining the deterministic causal relationship between the symbolic input transaction and the symbolic output transaction is referred to herein as replacing the data transformation component with a deterministic input/output pair.

The symbolic input transaction is a symbolic constant that is used to represent a set of possible input transactions. As is known to those of skill in the art of formal verification, a symbolic constant is a specific formal verification construct that is associated with a plurality of possible values (or a plurality of sets of values). During formal verification of a property of a hardware design comprising a symbolic constant, the symbolic constant has a constant value or set of values, but the formal verification tool verifies the property is true for each possible value or each possible set of values for the symbolic constant. Specifically, during a particular proof the value(s) for the symbolic input transaction are constant but all possible values for the symbolic input transaction are explored.

For example, if an example data transformation component receives inputs a and b wherein a can be between 0 and 5 and b can be between 1 and 20 then a symbolic input transaction for this data transformation component may be defined as a combination of a and b wherein a can be between 0 and 5 and b can be between 1 and 20. During formal verification the formal verification tool explores all possible symbolic input transactions (e.g. it explores a symbolic input transaction of a=1 and b=15 and a symbolic input transaction of a=2 and b=10 etc.). As a result, a symbolic constant provides a very efficient means to verify a plurality of values or sets of values. A symbolic constant may alternatively be referred to as a symbolic variable or a pseudo constant. In some cases, the symbolic input transaction may be used to represent all valid input transactions to the child data transformation component. What constitutes a valid input transaction will depend on the child data transformation component that is being replaced and the specification thereof.

The following is example SVA code that defines a symbolic input transaction for an example data transformation component that receives an input x that can be any 32 bit binary number, performs a data transformation on x to produce y which can be any 64 bit binary number, and then outputs y three cycles after x is received.

```
logic [31:0] symbolic_input_value;
assume ($stable(symbolic_input_value));
```

As is known to those of skill in the art, the first line of the above SVA code defines a local 32 bit signal symbolic_input_value that is initialised to a value between 0 and $2^{32}-1$ during a proof. The second line of the above SVA code is an assumption statement (i.e. constraint) that forces the value of symbolic_input_value to be constant throughout a proof.

The symbolic output transaction, like the symbolic input transaction, is a symbolic constant. However, instead of representing a set of input transactions, the symbolic output transaction is used to represent a set of output transactions. For example, if an output transaction is defined by outputs c and d where c can be between 10 and 20 and d can be between 1 and 20 then a symbolic input transaction may be defined as a combination of c and d wherein c can be any number between 10 and 20 and d can be any number between 1 and 20. In some cases, the set of output transactions that are represented by the symbolic output transaction may be all valid output transactions for the child data transformation component.

The following is example SVA code that defines a symbolic output transaction for an example data transformation component that receives an input x that can be any 32 bit binary number, performs a data transformation on x to produce y which can be any 64 bit binary number, and then outputs y three cycles after x is received.

```
logic [63:0] symbolic_output_value;
assume ($stable(symbolic_output_value));
```

As is known to those of skill in the art, the first line of the above SVA code defines a local 64-bit signal symbolic_output_value that is initialised to a value between 0 and $2^{64}-1$ when a thread of the code is initialised. The second line of the above SVA code is an assumption statement (i.e. constraint) that forces the value of symbolic_output_value to be constant throughout a proof.

The one or more formal constraints link the symbolic input transaction to the symbolic output transaction in a deterministic manner so that the symbolic output transaction for a particular symbolic input transaction is produced at the correct time. The constraints may be implemented via one or more formal assumption statements. As is known to those of skill in the art of formal verification, an assumption statement in, or related, to a component imposes a constraint on the operation of that component. An example assumption statement to link the symbolic input transaction to the symbolic output transaction for the example data transformation component 500 of FIG. 5 may state that if the input transaction is the symbolic input transaction (a specific a and b combination) then the symbolic output transaction (a specific c and d) is output three cycles after the symbolic input transaction is received.

The following is example SVA code for a formal constraint (e.g. assumption statement) that links the symbolic input transaction to the symbolic output transaction for an example data transformation component that receives an input x that can be any 32 bit binary number, performs a data transformation on x to produce y which can be any 64 bit binary number, and then outputs y three cycles after x is received. In this example input_x is the input x to the data transformation component, symbolic_input_value is the symbolic input transaction/value, output_y is the output y of the data transformation component, and symbolic_output_value is the symbolic output transaction/value.

--- assume (input_x == symbolic_input_value) |-> ##3 (output_y == symbolic_output_value)

---

As is known to those of skill in the art, the above assumption states that if the input (input_x) is the symbolic input transaction (symbolic_input_value) then three cycles later (##3) the output (output_y) is the symbolic output transaction (symbolic_output_value). This will cause the symbolic output transaction (which will be a particular value between 0 and $2^{64}-1$) to be output three cycles after the symbolic input transaction (which will be a particular value between 0 and $2^{32}-1$) is received. During formal verification of a property of hardware design comprising the above code, the formal verification tool verifies the property to be true when the symbolic input transaction (symbolic_input_value) and the symbolic output transaction (symbolic_output_value) pair are each possible input-output pair.

One of the advantages of abstracting data transformation components with a corresponding deterministic input/output pair is that this abstraction technique can be used for any data transformation component regardless of the complexity of the data transformation (e.g. arithmetic operation(s)) performed by the data transformation component. Specifically, the deterministic input/output pair abstraction method can be used for any data transformation component so long as the inputs that influence the output of that data transformation (i.e. the inputs defining an input transaction) are known.

In some cases, where a parent data transformation component comprises a plurality of child data transformation components, the abstracted hardware design for the parent data transformation component may also be modified/configured so as to link the deterministic input/output pairs of the child data transformation components so as to be able to verify that an input is processed by the desired combination of child data transformation components. For example, where a parent data transformation component comprises a first child data transformation component A that receives input x, performs a data transformation on x to produce an output y; and a second child data transformation component B that receives input y, performs a data transformation on y to produce an output z, the symbolic output transaction of the first child data transformation component may be linked or matched to the symbolic input transaction of the second child data transformation component B. This allows it to be verified that the output of the parent data transformation component is A(B(x)) without specifying what specific data transformations are performed by A and B. An example of how the symbolic inputs and outputs of the child data transformation components may be linked is described below.

Once the abstracted hardware design for a parent data transformation component has been generated, it is formally verified that an instantiation of the abstracted hardware design will produce an expected output transaction in response to each of a plurality of input transactions. In some cases, the input transactions comprise all valid input transactions into the parent data transformation component. As described above, as the logic that performs the data transformation (e.g. arithmetic calculation) is removed from the abstracted hardware design, this verification does not verify that the instantiation of the abstracted hardware design transforms the data correctly, only that for each of the plurality of input transactions the corresponding output transaction occurs at the correct time and that the input transaction is processed by, or passes through, the correct child data transformation components in the correct order.

Formally verifying that an instantiation of the abstracted hardware design for a parent data transformation component will produce an expected output transaction in response to each of a plurality of test input transactions may comprise generating a test bench in a formal verification language, such as, but not limited to SVA, that defines one or more assertions to be verified (and optionally one or more assumptions/constraints and/or modelling logic); linking the test bench to the abstracted hardware design for the parent data transformation component; and formally verifying, using a formal verification tool, that the one or more assertions are true (or hold) for the abstracted hardware design for the parent data transformation component, and outputting one or more signals indicating whether the one or more assertions were successfully verified.

The following is example SVA code for abstracting the child data transformation components of a parent data transformation component that comprises a first child data transformation component C1 that receives inputs a and b, performs a data transformation on a and b to produce c and which is output three cycles after a and b are received; and a second child data transformation component C2 that receives input c, performs a data transformation on c to produce d which is output one cycle after c is received; and example SVA code for an assertion to verify the operation of the abstracted hardware design for the parent data transformation component.

In this example c1_a_in is the first input a to the first child data transformation component C1; c1_b_in is the second input b to the first child data transformation component C1; c1_c_out is the output c of the first data transformation component; c2_c_in is the input c to the second child data transformation component C2; c2_d_out is the output d of the second data transformation component C2; top_in_a is the first input a to the parent data transformation component; top_in_b is the second input b to the parent data transformation component; top_out_d is the output d of the parent data transformation component; watched_a is the symbolic input a, watched_b is the symbolic input b (together watched_a and watched_b define the symbolic input transaction); watched_c is the symbolic output/input c; and watched_d is the symbolic output d.

```
//Abstracted component for first child data transformation
component
assume property ((c1_a_in == watched_a) && (c1_b_in ==
watched_b)) |-> ##3 (c1_c_out == watched_c);
//Abstract component for second child data transformation
component
assume property (c2_c_in == watched c) |-> ##1 (c2_d_out ==
watched_d);
//Assertion to verify parent data transformation component
assert property ((top_in_a == watched_a) && (top_in_b ==
watched_b)) |-> ##4 (top_out_d == watched_d)
```

A person of skill in the art would understand that the first line of code (starting with "assume property ((c1 . . . ") sets out a constraint that when the input to the first child data transformation component C1 is the symbolic input transaction (i.e. when input a is the symbolic a (c1_a_in==watched_a) and input b is the symbolic b (c1_b_in==watched_b)) then the symbolic output transaction will be output (c1_c_out==watched_c) three cycles (##3) after the symbolic input transaction is received.

A person of skill in the art would understand that the second line of code (starting with "assume property ((c2 . . . ") sets out a constraint that when the input to the second child data transformation component C2 is the symbolic input transaction (i.e. when input c is the symbolic c (c2_c_in==watched_c)) then the symbolic output will be output (c2_d_out==watched_d) one cycle (##1) after the symbolic input transaction is received. It can be seen that the symbolic input to C2 is set to the symbolic output of the first child data transformation component C1 so as to link the two child data transformation components.

A person of skill in the art would understand that the third line of code (starting with "assert property . . . ") is an assertion that states when the input to the parent data transformation component is the symbolic input transaction to the first child data transformation component (top_in_a==watched_a) && (top_in_b==watched_b)) then the output of the parent data transformation is the symbolic output transaction of the second child data transformation component (top_out_d==watched_d). Verifying this assertion, using a formal verification tool, for each valid input to the parent data transformation component, verifies that each valid input transaction will be processed by the expected combination of child data transformation components and will be output by the parent data transformation component at the correct time.

When a formal verification tool is used to verify an assertion, the formal verification tool may output an indication of whether or not the assertion is valid (i.e. the asserted property is true for all valid states or sequences of states), which may also be referred to herein as the assertion being successfully verified. The output may be yes, the assertion is valid or has been successfully verified; no, the assertion is not valid (i.e. the asserted property it is not true or has failed for at least one valid state or sequence of states) or has not been successfully verified; or the formal verification was inconclusive. The formal verification may be inconclusive, for example, because the computing-based device running the formal verification tool has run out of memory or because the formal verification tool has determined that a certain amount of progress has not been made after a predefined period of time.

Where an assertion is not valid or has not been successfully verified, the formal verification tool may also output information indicating a state or sequence of states of the hardware design which causes the asserted property to fail. For example, the formal verification tool may output a trace of the verification indicating at what point, state or sequence of states the failure occurred.

Once the verification of the hardware designs for the parent data transformation components is complete the method 100 may end or the method may proceed to block 106.

At block 106, a determination may be made as to whether the verifications in blocks 102 and 104 were successful. As described above, when a formal verification tool is used to verify an assertion for a hardware design, the formal verification tool may output a signal or a set of signals that indicates whether or not the assertion is valid (i.e. the asserted property is true for all valid states or sequence of states). In these cases, the determination as to whether the verifications were successful may be based on the output signal(s).

If it is determined that the verifications were successful (indicating that an instantiation of the hardware design for the main data transformation component will work as expected) the method 100 may proceed to block 108 where an integrated circuit embodying the main data transformation component described by the hardware design is manufactured. If, however, it is determined that one or more of the verifications performed in block 102 or block 104 was not successful then the method 100 may proceed to block 110.

At block 110, a determination is made as to whether any of the unsuccessful verifications were unsuccessful because they were inconclusive (e.g. did not converge). A formal verification is inconclusive if the formal verification tool is unable to solve the mathematical problem presented by the hardware design and the properties to verify. If, at least one of the unsuccessful verifications was inconclusive, then the method 100 may proceed to block 112. If, however, none of the unsuccessful verifications were unsuccessful because they were inconclusive, indicating they were unsuccessful because one of the properties being verified was not found to be true for the hardware design/abstracted hardware design, then the method 100 may proceed to block 114.

At block 112, a new, or different, hierarchical set of data transformation components is selected to represent the main data transformation component. In some cases, the new, or different, hierarchical set of data transformation components may be generated by sub-dividing any data transformation component in the current hierarchical set of data transformation components whose verification was inconclusive into at least two data transformation components. For example, if the verification of the hardware design for a leaf data transformation component in the first hierarchical set of data transformation components used to represent the main data transformation component was inconclusive, it may have been that the leaf data transformation component was too complex to verify as a single block or component. Accordingly, that leaf data transformation component may be sub-divided into a plurality of data transformation components. In other words, that leaf data transformation component may be converted to a parent data transformation components with a plurality of child data transformation components. Although it is much more likely that the verification of the hardware design for a leaf data transformation component will be inconclusive than the verification of the abstracted hardware design for a parent data transformation component, since the complex logic performing the data transformation(s) has been removed from the abstracted hardware design of a parent data transformation component, it is possible for the verification of the abstracted hardware design for a parent data transformation component to be inconclusive. This may occur, for example, if there are complex interactions between the child data transformation components of a parent data transformation component.

Once a new, or different, hierarchical set of data transformation components has been selected to represent the main data transformation component, the method 100 may proceed back to blocks 102 and 104 where at least a portion of the leaf and parent data transformation components of the new hierarchical set of data transformation components are verified as described above. In some cases, only the leaf and parent data transformation components which were not already verified in an earlier iteration of blocks 102 and 104 may be verified in a subsequent iteration of blocks 102 and 104. For example, if the only difference between the first hierarchical set of data transformation components that was used for a first iteration of blocks 102 and 104 and the second hierarchical set of data transformation components used in a second iteration of blocks 102 and 104 is the change of a leaf data transformation component into a parent data transformation component with two child/leaf data transformation components, then only that new parent data transformations and its children/leaf data transformation components may be verified in the second iteration of blocks 102 and 104.

At block 114, the hardware design for the main data transformation component is modified to correct the error in the hardware design that caused the verification(s) to fail. In some cases, the information indicating a state or sequence of states of the hardware design which caused an asserted property to fail (e.g. a counter example) may be used to identify/locate the error in the hardware design. Once the hardware design has been modified the modified hardware design may be re-verified (e.g. blocks 102-110 may be repeated for the modified hardware design).

Although in the example method 100 of FIG. 1 the data transformation components are verified by working up through the hierarchy from the leaf data transformation components, this is not necessarily the case in other examples. In particular, the order in which the data transformation components are verified is not important and can be changed from the order described herein. In some examples, it would be possible to verify multiple data transformation components in parallel, even if some of those multiple data transformation components being verified in parallel have a parent-child relationship in the hierarchy. This is because the abstraction of the child data transformation components in a hardware design for a parent data transformation component makes the verification tasks of verifying the child and parent data transformation components independent from each other.

Although in the example method 100 of FIG. 1 the verifications described with respect to block 102 (i.e. the verifications of the hardware designs for the leaf data transformation components) are completed via formal verification, in other examples the verifications of the hardware designs for the leaf data transformation components may be completed via other suitable verification methods. For example, alternatively the verification of the hardware design for one or more of the leaf data transformation components may be performed via simulation-based verification. However, depending on the type of component, the number of input transactions may be quite large which may make performing the verification via simulation intractable.

Although in the example method 100 of FIG. 1 the description of a child data transformation component in the hardware design for the parent data transformation component is completely replaced with an abstracted component (e.g. a deterministic input/output pair) in other examples the abstracted component (e.g. deterministic input/output pair) only replaces the logic that drives the data outputs and the control logic of the child data transformation component remains.

Figure 6:
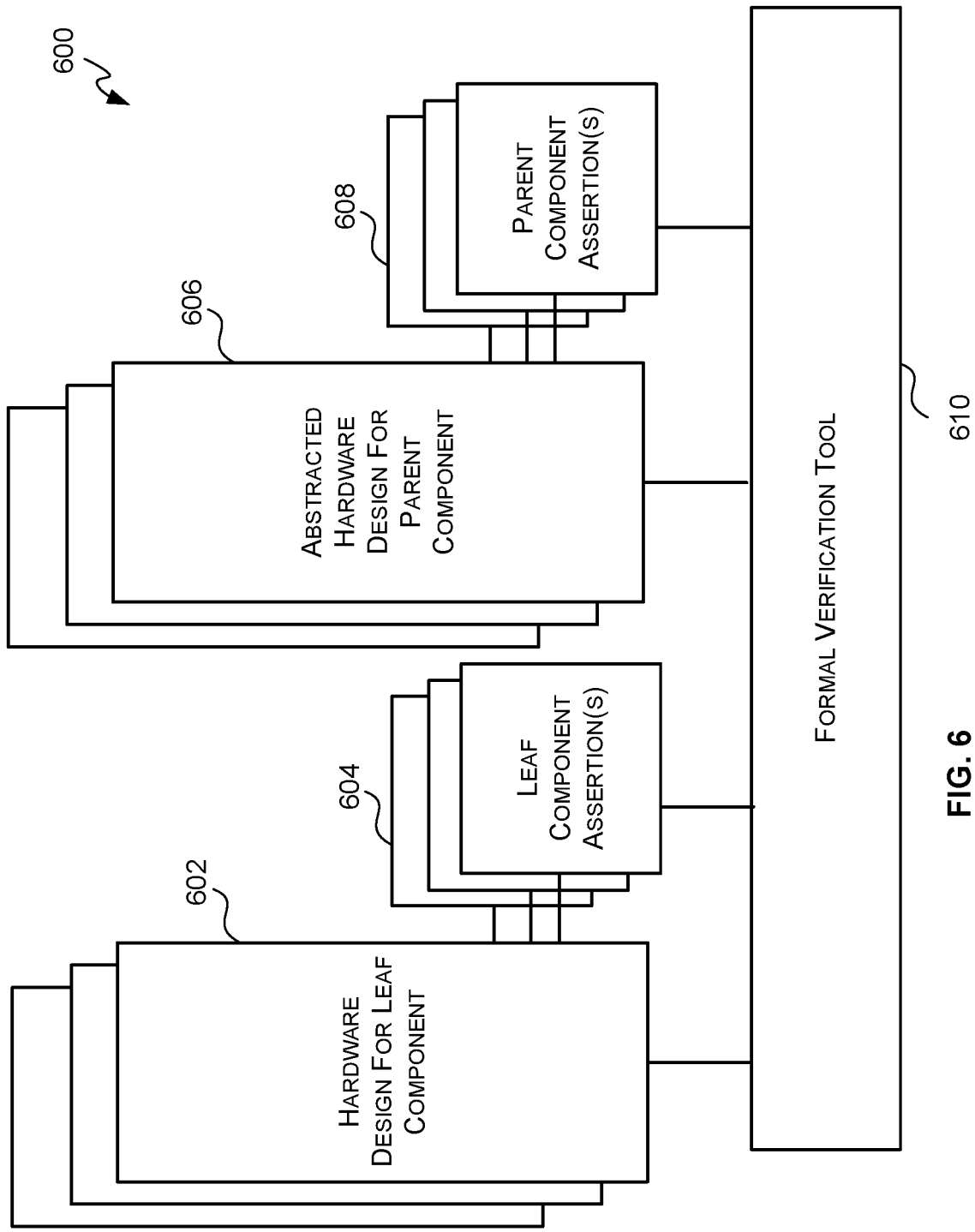
FIG. 6 is a block diagram of an example system for verifying a hardware design for a data transformation component.

Reference is now made to FIG. 6 which illustrates an example system 600 for verifying a hardware design for a main data transformation component. The system 600 may be implemented by one or more computing-based devices, such as the computing-based device 700 described below with respect to FIG. 7. For example, one or more of the components of the system 600 of FIG. 6 may be implemented as computer readable instructions, which when executed by a computing-based device, cause the computing-based device to perform the functions of the component described below.

As described above, the main data transformation component is formed of, or can be described as, a hierarchical set of data transformation components. Each data transformation component in the hierarchy, except the leaf data transformation components in the hierarchy, comprises at least one data transformation component of the next lowest level. At least a portion of the hardware design for the main data transformation component corresponds to each data transformation component of the hierarchical set of data transformation components. The portion of the hardware design for the main data transformation component that corresponds to a data transformation component of the hierarchical set of data transformation components is referred to herein as the hardware design for that data transformation component.

The system 600 comprises the hardware design 602 for each leaf data transformation component; a test bench comprising a set of one or more assertions 604 for each leaf data transformation component; an abstracted hardware design 606 for each parent data transformation component; a test bench comprising a set of one or more assertions 608 for each parent data transformation component; and a formal verification tool 610.

The hardware design 602 for a leaf data transformation component comprises a description of the structure and/or function of that leaf data transformation component. The abstracted hardware design 606 for a parent data transformation component comprises a description of the structure and/or function of the parent data transformation component, wherein the description of any child data transformation component therein has been replaced with a description of a corresponding abstracted component. As described above, the corresponding abstracted component for a data transformation component is configured to, for a specific input transaction to the data transformation component, output a specific output transaction with a deterministic causal relationship thereto (e.g. at the correct time) according to the specification for the data transformation component, wherein the specific input and output transactions are selectable from a plurality of possible input transactions and a plurality of possible output transactions respectively. The description of the abstracted component for a child data transformation component may comprise a definition of a symbolic input transaction to the child data transformation component, a definition of a symbolic output transaction for the child data transformation component, and one or more constraints that deterministically link the symbolic input transaction to the symbolic output transaction.

The test bench 604 for each of the leaf data transformation components comprises a set of one or more assertions, which if verified to be true for the hardware design 602 for the leaf data transformation component, verifies that an instantiation of the hardware design for the leaf data transformation component generates an expected output in response to each of a plurality of input transactions. As described above, in some cases the plurality of input transactions may comprise all valid input transactions to the leaf data transformation component. The test bench 604 may also comprise one or more constraints/assumptions and/or modelling logic.

The test bench 608 for each of the parent data transformation components comprises a set of one or more assertions, which if verified to be true for the abstracted hardware design 606 for the parent data transformation component, verifies that an instantiation of the abstracted hardware design for the parent data transformation component produces an expected output transaction in response to each of a plurality of input transactions. As described above, in some cases, the plurality of input transactions for the parent data transformation component may comprise all valid input transaction to the parent data transformation component. The test bench 604 may also comprise one or more constraints/assumptions and/or modelling logic Verifying each set of assertions for the corresponding abstracted hardware design verifies that an instantiation of the hardware design for the parent data transformation component will perform the desired data transformations in the desired order on the appropriate data, not necessarily that an instantiation of the hardware design for the parent data transformation component produces the correct result. Together the verifications performed on the hardware designs for the leaf data transformation components and the verifications performed on the abstracted hardware designs for the parent data transformation components verify the overall correctness or the overall consistency of the hardware design for the main data transformation component.

Each test bench 604, 608 is linked to the corresponding hardware design/abstracted hardware design so that the one or more assertions of each test bench are connected to the relevant signals of the hardware designs so as to be able to evaluate the asserted property/properties. As described above, a test bench 604, 608 may be linked to a hardware design by binding the test bench 604, 608 to the hardware design or incorporating the test bench into the hardware design.

As described above, the formal verification tool 610 is a software tool that is capable of performing formal verification of a hardware design.

The hardware designs/abstracted hardware designs 602, 606 for the data transformation components, the test benches (each comprising a set of one or more assertions) 604, 608, and the bindings (if any) are loaded in the formal verification tool 610. The formal verification tool 610 is then configured to formally verify each set of one or more assertions for the corresponding hardware design/abstracted hardware design. Specifically, for each leaf data transformation component the formal verification tool 610 is configured to verify that the set of one or more assertions 604 for that leaf data transformation component is true for the hardware design 602 for that leaf data transformation component; and for each parent data transformation component the formal verification tool 610 is configured to verify that the set of one or more assertions 608 for that parent data transformation component is true for the abstracted hardware design 606 for that parent data transformation component.

When the formal verification tool 610 is used to verify an assertion, the formal verification tool 610 may output an indication of whether or not the assertion is valid (i.e. the asserted property is true for all valid states or sequence of states), which may also be referred to herein as the assertion being successfully verified. The output may be yes, the assertion is valid or has been successfully verified; no, the assertion is not valid (i.e. it is not true or has failed for at least one valid state or sequence of states) or has not been successfully verified; or the formal verification was inconclusive. The formal verification may be inconclusive, for example, because the computing-based device running the formal verification tool 610 has run out of memory or because the formal verification tool 610 has determined that a certain amount of progress has not been made after a predefined period of time.

Where an assertion is not valid or has not been successfully verified, the formal verification tool 610 may also output information indicating a state or sequence of states of the hardware design which causes the assertion to fail. For example, the formal verification tool 610 may output a trace of the verification indicating at what point, state or sequence of states the failure occurred. In other words, the formal verification tool 610 may output a counter example.

Where one or more of the verifications is performed via another verification method, the system may additionally comprise one or more other verification tools. For example, where one or more of the verifications is performed via simulation-based verification the system may comprise a simulation engine.

As is known to those of skill in the art, a simulation engine is a software tool capable of performing simulation-based verification of a hardware design. In particular, a simulation engine monitors the output of one or more instantiations of the hardware design in response to each input vector in a test set and compares the outputs to known expected outputs to determine if the instantiation is behaving as expected.

A simulation engine may perform the simulation-based verification using any known method. For example, the simulation engine may receive the hardware design in, for example HDL, convert the HDL to another language, such as C, and perform the simulation on the C code; the simulation engine may receive the hardware design as, for example, HDL and perform the simulation directly on the HDL; or the simulation engine may implement the hardware design in hardware and perform the simulation on the hardware. Once the simulation is complete, the simulation engine may output an indication of whether or not the hardware design passed the simulation.

The methods and systems described above are configured to verify a hardware design for a main data transformation component by representing the main data transformation component as a hierarchical set of data transformation components, verifying the hardware design for each data transformation component separately, and simplifying the verification of the hardware designs for all but the leaf data transformation components by abstracting the description of child data transformation components therein with a deterministic input-output pair. The Applicant submits that the representation of a data transformation component as a hierarchical set of data transformation components and the abstraction of lower level data transformation components in a data transformation component as a deterministic input-output pair can also be used in the design process for designing a data transformation component. Specifically, it can be used to develop a specification for the hardware design. However, instead of starting with the leaf data transformation components and abstracting out the description of lower level components from the hardware design of higher level components, as in the verification case, the architect, engineer or hardware designer starts with the highest level data transformation component and at each level down in the hierarchy adds more detail to the operation of the higher level component.

Specifically, the architect, engineer or hardware designer may first develop a high level specification for the data transformation component in a formal verification language, such as, but not limited to, SVA, that describes: (a) the input(s) and output(s) of the level 1 component; (b) a set of data transformation components (which may be referred to herein as the level 2 data transformation components) which generate the output from the input; and (c) how the input data moves through the level 2 data transformation components to generate the output (i.e. the interactions between the level 2 data transformation components).

This will now be described using an example data transformation component that is configured to receive an input x and output y five cycles after receiving x, wherein y is is the reciprocal square root of x. Specifically, for this example data transformation component the specification may define an input x and an output y.

The specification may then describe that the data transformation component comprises a reciprocal component that receives an input and outputs the reciprocal thereof; and a square root component that receives an input and produces the square root thereof. However, instead of describing the mathematical operations that are performed by the reciprocal and square root components at this stage, the specification may describe only what the inputs and outputs of the reciprocal and square root components are, and how the inputs and outputs of the reciprocal and square root components are related to each other (i.e. which inputs influence which outputs, rather than a full description of the functionality). In other words, the specification stipulates or defines a deterministic input-output pair for each data transformation component of the first set of data transformation components. For example, the specification may describe for each level 2 data transformation component: (a) a symbolic input transaction; (b) a symbolic output transaction; and (c) the deterministic relationship between the symbolic input transaction and the symbolic output transaction. For example, the specification may describe that the symbolic input transaction for the square root component is a value y that is between 1 and 25, that a symbolic output transaction is a value z that is between 1 and 5, and that when the symbolic input transaction occurs the symbolic output transaction is output three cycles later.

The specification of the component may also describe how data moves through the component. For example, the specification may describe that the input to the main data transformation component is the input to the reciprocal component, the output of the reciprocal component is the input to the square root component, and the output of the square root component is the output of the main data transformation component. The specification may then set out the requirement (e.g. specified by one or more assertions) that for any valid input x to the reciprocal square root component (e.g. specified by one or more assumptions) that the corresponding output y is produced 5 cycles therefrom, wherein the output is the result of a reciprocal operation and a square root operation.

In this way, the specification of such a data transformation component is equivalent to the abstracted hardware design for that data transformation component, as described above, in combination with the one or more assertions used to verify that abstracted hardware design.

The architect, engineer or hardware designer then analyses each level 2 data transformation component to determine whether the specifics of the data transformations performed by that level 2 data transformation component are to be specified or whether the level 2 data transformation component can be described as a set of level 3 data transformation components. The process above is then repeated for each level 2 data transformation component that can be described as a set of level 3 data transformation components. Specifically, for each of these level 2 data transformation components, the architect, engineer or hardware designer develops a specification for that level 2 data transformation component that describes (a) the inputs and outputs to the component, (b) a set of data transformation components (i.e. a set of level 3 data transformation components) that process the input to generate the output; and (c) how the input data to the level 2 data transformation component moves through the set of level 3 data transformation components to generate the output, wherein each level 3 data transformation component is represented by a deterministic input/output pair. This process is repeated until a level is reached where the specifics of the data transformations performed by each of the data transformation components at that level is to be specified. A detailed specification is then developed for each data transformation component at that level from which a hardware design for that data transformation component is generated.

Generally, when developing a specification for a hardware design it is difficult to specify the data transformations performed by a data transformation component in an abstract manner. This is because accurately expressing the data transformation that is performed often takes the same amount of code and/or effort as developing the hardware design itself. This makes the abstraction of data transformations in a specification of limited use as it neither saves engineering time nor reduces logical complexity. Accordingly, developing specifications in the hierarchical manner described above allows architects, engineers and/or hardware designers to defer fully describing the data transformations to a lower level, which reduces the engineering time to move to the next level, and reduces the logic complexity at the current level.

Writing the specification(s) of a data transformation component in a formal verification language (e.g. SVA) can offer a number of advantages over writing the specification(s) in English (or any other human-spoken language). Firstly, formal verification languages (e.g. SVA) generally have a flexible syntax which can define specific relational behaviour over time.

Secondly, specifications written in English (or any other human language) can be ambiguous as it is natural to interpret English language descriptions based on one's own understanding of things/history which may not be the same way another person interprets the same description. In contrast, writing specifications in a formal verification language typically removes the ambiguity as it forces the writer to specify the requirements using the formal verification language constructs available.

Thirdly, while writing specifications in a formal verification language (e.g. SVA) may take more time than writing a specification in English (or any other human language) the formal verification specification may save time by removing ambiguity. The inherent ambiguity in human language also means that one doesn't automatically question themselves when writing a specification in a human language as one assumes it will be interpreted in the same manner as the writer had intended. In contrast, writing a specification in a formal verification language forces the architect, engineer or hardware developer to think about and clarify the ambiguity. In other words, writing a specification in a formal verification language forces the architect, engineer or hardware developer to be more precise.

Fourthly, due to the ambiguity in human language specifications it cannot be guaranteed that a hardware design for a data transformation component that conforms to the specification will work in a higher level data transformation component. As a specification written in a formal verification language removes the ambiguity, it also removes this issue.

Lastly, writing the specification of the data transformation component in a formal verification language (e.g. SVA) allows the hardware design for such a data transformation component to be easily verified using a hierarchical formal verification method such as the method of FIG. 1. Specifically, the specifications of the parent data transformation components represent the abstracted hardware designs of the parent data transformation components described above and thus can be directly used to verify the parent data transformation components.

Figure 7:
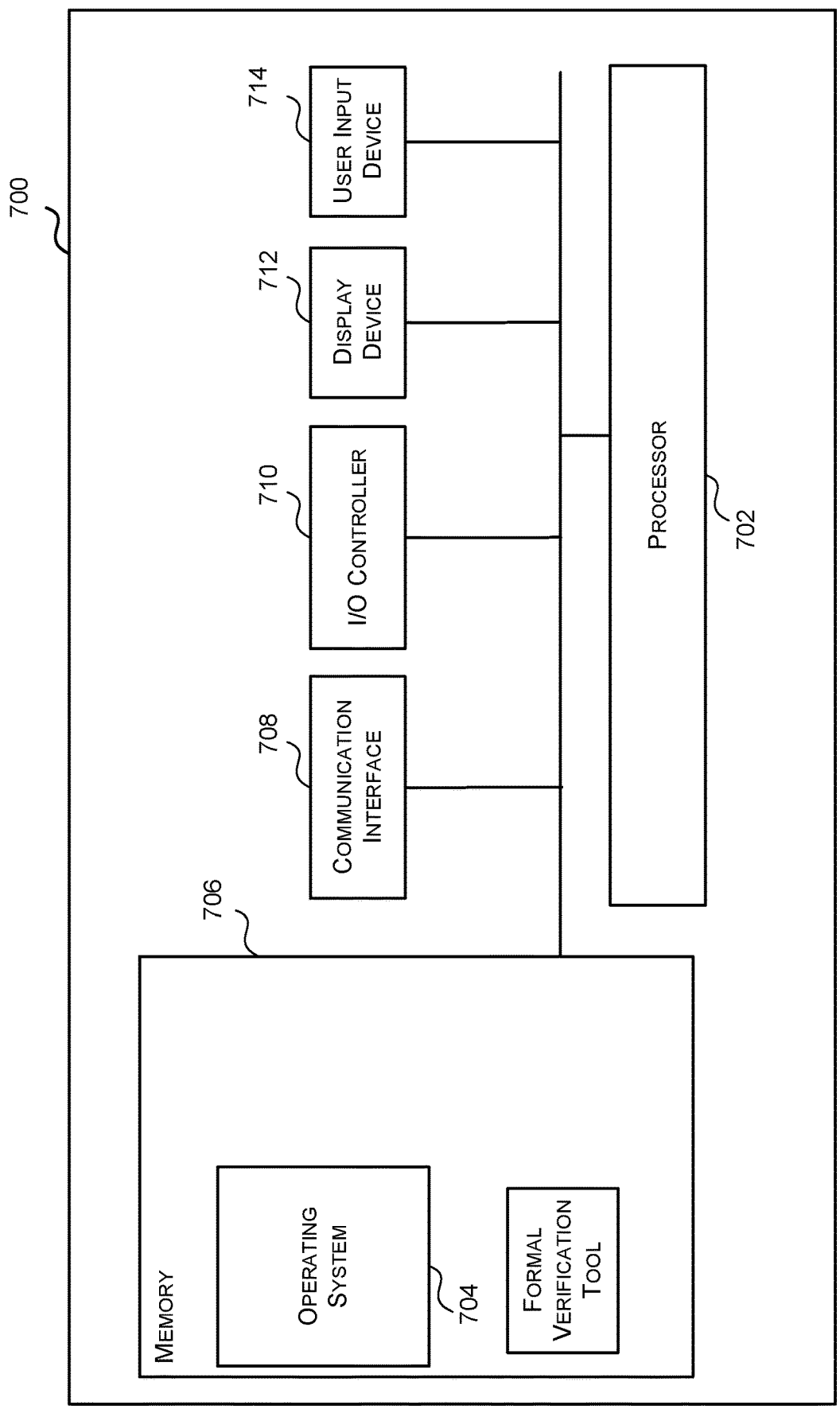
FIG. 7 is a block diagram of an example computing-based device.

FIG. 7 illustrates various components of an exemplary computing-based device 700 which may be implemented as any form of a computing and/or electronic device, and in which embodiments of the methods and systems described herein may be implemented.

Computing-based device 700 comprises one or more processors 702 which may be microprocessors, controllers or any other suitable type of processors for processing computer executable instructions to control the operation of the device in order to verify a hardware design for a data transformation component. In some examples, for example where a system on a chip architecture is used, the processors 702 may include one or more fixed function blocks (also referred to as accelerators) which implement a part of the method of verifying a hardware design for a data transformation component, in hardware (rather than software or firmware). Platform software comprising an operating system 704 or any other suitable platform software may be provided at the computing-based device to enable application software, such as a formal verification tool, to be executed on the device.

The computer executable instructions may be provided using any computer-readable media that is accessible by computing-based device 700. Computer-readable media may include, for example, computer storage media such as memory 706 and communications media. Computer storage media (i.e. non-transitory machine-readable media), such as memory 706, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine-readable media, e.g. memory 706) is shown within the computing-based device 700 it will be appreciated that the storage may be distributed or located remotely and accessed via a network or other communication link (e.g. using communication interface 708).

The computing-based device 700 also comprises an input/output controller 710 arranged to output display information to a display device 712 which may be separate from or integral to the computing-based device 700. The display information may provide a graphical user interface. The input/output controller 710 is also arranged to receive and process input from one or more devices, such as a user input device 714 (e.g. a mouse or a keyboard). This user input may be used to initiate verification. In an embodiment the display device 712 may also act as the user input device 714 if it is a touch sensitive display device. The input/output controller 710 may also output data to devices other than the display device, e.g. a locally connected printing device (not shown in FIG. 7).

Figure 8:
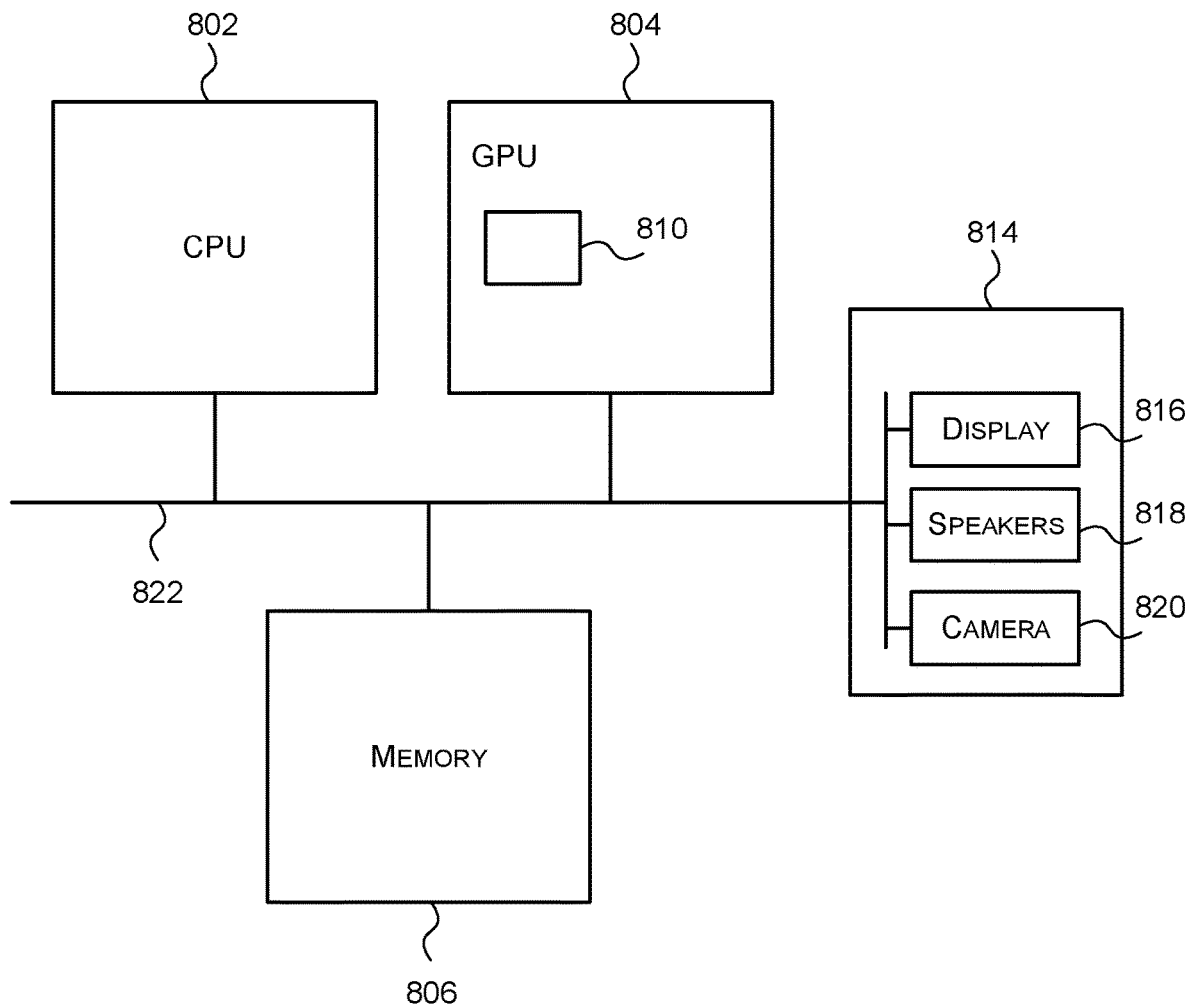
FIG. 8 is a block diagram of an example computer system in which a data transformation component described herein may be implemented.

FIG. 8 shows a computer system in which any of the data transformation components described herein may be implemented. The computer system comprises a CPU 802, a GPU 804, a memory 806 and other devices 814, such as a display 816, speakers 818 and a camera 820. A data transformation component 810 (such as, but not limited to, the data transformation component 200 of FIG. 2) is implemented on the GPU 804. In other examples, the data transformation component 810 may be implemented on the CPU 802. The components of the computer system can communicate with each other via a communications bus 822.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL.

Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset (e.g. hardware design) that when processed (i.e. run) in an integrated circuit manufacturing system configures the system to manufacture a device (e.g. processor or other computing-based device) comprising any apparatus (e.g. data transformation component) described herein. An integrated circuit definition dataset may be, for example, an integrated circuit description.

Therefore, there may be provided a method of manufacturing, at an integrated circuit manufacturing system, a data transformation component as described herein. Furthermore, there may be provided an integrated circuit definition dataset (e.g. hardware design) that, when processed in an integrated circuit manufacturing system, causes the method of manufacturing an integrated circuit embodying the data transformation component to be performed.

An integrated circuit definition dataset (e.g. hardware design) may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset (e.g. hardware design) at an integrated circuit manufacturing system so as to configure the system to manufacture an integrated circuit embodying a data transformation component will now be described with respect to FIG. 9.

Figure 9:
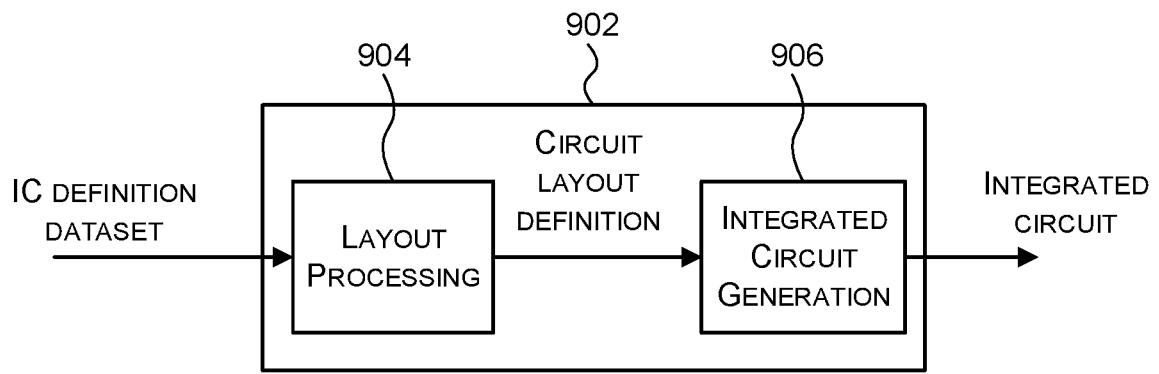
FIG. 9 is a block diagram of an example integrated circuit manufacturing system which may be used to generate an integrated circuit embodying a data transformation component described herein.

FIG. 9 shows an example of an integrated circuit (IC) manufacturing system 902 which is configured to manufacture an integrated circuit embodying a data transformation component as described in any of the examples herein. In particular, the IC manufacturing system 902 comprises a layout processing system 904 and an integrated circuit generation system 906. The IC manufacturing system 902 is configured to receive an IC definition dataset, such as a hardware design, (e.g. defining a data transformation component as described in any of the examples herein), process the IC definition dataset, and generate an IC according to the IC definition dataset (e.g. which embodies a data transformation component as described in any of the examples herein). The processing of the IC definition dataset configures the IC manufacturing system 902 to manufacture an integrated circuit embodying a data transformation component as described in any of the examples herein.

The layout processing system 904 is configured to receive and process the IC definition dataset (e.g. hardware design) to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an integrated circuit embodying data transformation component without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of verifying a hardware design for a main data transformation component, the main data transformation component being representable as a hierarchical set of data transformation components, the hierarchical set of data transformation components comprising (i) a plurality of leaf data transformation components which do not have children in the hierarchical set of data transformation components, and (ii) one or more parent data transformation components which each comprise one or more child data transformation components in the hierarchical set of data transformation components, wherein the hardware design for the main data transformation component comprises a hardware design for each data transformation component of the hierarchical set of data transformation components, the method comprising:

for each of the plurality of leaf data transformation components, verifying, at one or more processors, that an instantiation of the hardware design for the leaf data transformation component generates an expected output transaction in response to each of a plurality of test input transactions; and for each of the one or more parent data transformation components, formally verifying, at the one or more processors using a formal verification tool, that an instantiation of an abstracted hardware design for the parent data transformation component generates an expected output transaction in response to each of a plurality of test input transactions, wherein the abstracted hardware design for the parent data transformation component represents each of the one or more child data transformation components of the parent data transformation component with a corresponding abstracted component that is configured to, for a specific input transaction to the child data transformation component, produce a specific output transaction with a causal deterministic relationship to the specific input transaction, wherein during formal verification the formal verification tool is configured to select the specific input transaction and the specific output transaction pair to be each possible valid input transaction and valid output transaction pair for the child data transformation component;

wherein an instantiation of a hardware design embodies that hardware design in a form which can be tested to verify that hardware design.

2. The method of claim 1, wherein the corresponding abstracted component for a child data transformation component is defined in a formal verification language by a definition of a symbolic input transaction to the child data transformation component which specifies the specific input transaction, a definition of a symbolic output transaction of the child data transformation component which specifies the specific output transaction, and one or more constraints that establish a deterministic causal relationship between the symbolic input transaction and the symbolic output transaction.

3. The method of claim 2, wherein the symbolic input transaction to the child data transformation component is a symbolic constant that represents the valid input transactions to the child data transformation component.

4. The method of claim 2, wherein the symbolic output transaction to the child data transformation component is a symbolic constant that represents the valid output transactions for the child data transformation component.

5. The method of claim 2, wherein the one or more constraints are implemented by one or more formal assumption statements.

6. The method of claim 2, wherein when a parent data transformation component comprises a plurality of child data transformation components the abstracted hardware design for that parent data transformation component comprises a description of a relationship between the symbolic input and output transactions of the plurality of child data transformation components.

7. The method of claim 1, wherein each data transformation component of the hierarchical set of data transformation components is configured to receive one or more data inputs, perform a data transformation on the one or more data inputs, and output a result of the data transformation.

8. The method of claim 1, wherein verifying that an instantiation of the hardware design for a leaf data transformation component generates an expected output transaction in response to an input transaction comprises verifying that the instantiation of the hardware design for the leaf data transformation component generates an output transaction, with a deterministic causal relationship to the input transaction, that is correct with respect to a data transformation to be performed by the leaf data transformation component.

9. The method of claim 1, wherein verifying that an instantiation of the abstracted hardware design for a parent data transformation component generates an expected output transaction in response to an input transaction comprises verifying that an instantiation of the abstracted hardware design for the parent data transformation component generates an output transaction, with a deterministic causal relationship to the input transaction, that has been generated by processing the input transaction through an expected combination of the one or more child data transformation components of that parent data transformation component.

10. The method of claim 1, wherein the plurality of test input transactions for a leaf data transformation component comprises all valid input transactions to the leaf data transformation component.

11. The method of claim 1, wherein the plurality of test input transactions for a parent data transformation component comprises all valid input transactions to the parent data transformation component.

12. The method of claim 1, wherein verifying that an instantiation of the hardware design for a leaf data transformation component generates an expected output transaction in response to each of a plurality of test input transactions comprises formally verifying, using a formal verification tool, that an instantiation of the hardware design for the leaf data transformation component generates an expected output transaction in response to each of the plurality of test input transactions.

13. The method of claim 1, further comprising outputting one or more control signals indicating whether each of the verifications was successful.

14. The method of claim 1, further comprising, in response to determining that at least one of the verifications was not successful, determining whether the at least one of the verifications that was not successful was inconclusive; and in response to determining that the at least one of the verifications that was not successful was inconclusive, representing the main data transformation component using a different hierarchical set of data transformation components, and repeating the verifications for at least a portion of the data transformation components of the different hierarchical set of data transformation components.

15. The method of claim 14, further comprising, in response to determining that the verification of the hardware design for a leaf data transformation component was inconclusive, converting that leaf data transformation component into a parent data transformation component that comprises a plurality of leaf data transformation components to form the different hierarchical set of data transformation components, and verifying the hardware design for each of the plurality of child data transformation components of that parent data transformation component and verifying an abstracted hardware design for that parent data transformation component.

16. The method of claim 14, further comprising, in response to determining that the at least one verification that was not successful was not inconclusive, modifying the hardware design for the main data transformation component to generate a modified hardware design for the main data transformation component.

17. The method of claim 1, further comprising, in response to determining that the verifications were successful, manufacturing, using an integrated circuit manufacturing system, an integrated circuit embodying the main data transformation component according to the hardware design.

18. The method of claim 1, wherein, when processed at an integrated circuit manufacturing system, the hardware design for the main data transformation component configures the integrated circuit manufacturing system to manufacture an integrated circuit embodying the main data transformation component.

19. A system for verifying a hardware design for a main data transformation component, the main data transformation component being representable as a hierarchical set of data transformation components, the hierarchical set of data transformation components comprising (i) a plurality of leaf data transformation components which do not have children in the hierarchical set of data transformation components, and (ii) one or more parent data transformation components which each comprise one or more child data transformation components in the hierarchical set of data transformation components, wherein the hardware design for the main data transformation component comprises a hardware design for each data transformation component of the hierarchical set of data transformation components, the system comprising:
  memory configured to store:
    the hardware design for each of the plurality of leaf data transformation components,
    an abstracted hardware design for each of the one or more parent data transformation components, wherein the abstracted hardware design for a parent data transformation component represents each of the one or more child data transformation components of the parent data transformation component with a corresponding abstracted component that is configured to, for a specific input transaction to the child data transformation component, produce a specific output transaction with a causal deterministic relationship to the specific input transaction, wherein during formal verification of the abstracted hardware design for a child data transformation component a formal verification tool is configured to select the specific input transaction and the specific output transaction pair to be each possible valid input transaction and valid output transaction pair for the child data transformation component, and
  one or more verification tools comprising one or more formal verification tools; and
  one or more processors configured to:
    cause at least one of the one or more verification tools to verify that an instantiation of the hardware design for each of the plurality of leaf data transformation components produces an expected output transaction in response to each of a plurality of test input transactions, and cause at least one of the one or more formal verification tools to formally verify that an instantiation of the abstracted hardware design for each of the one or more parent data transformation components produces an expected output transaction in response to each of a plurality of test input transactions;

wherein an instantiation of a hardware design embodies that hardware design in a form which can be tested to verify that hardware design.

20. A non-transitory computer readable storage medium having stored thereon computer readable instructions that, when executed at a computer system, cause the computer system to perform a method to verify a hardware design for a main data transformation component, the main data transformation component being representable as a hierarchical set of data transformation components, the hierarchical set of data transformation components comprising (i) a plurality of leaf data transformation components which do not have children in the hierarchical set of data transformation components, and (ii) one or more parent data transformation components which each comprise one or more child data transformation components in the hierarchical set of data transformation components, wherein the hardware design for the main data transformation component comprises a hardware design for each data transformation component of the hierarchical set of data transformation components, the method comprising:

for each of the plurality of leaf data transformation components, verifying, at one or more processors, that an instantiation of the hardware design for the leaf data transformation component generates an expected output transaction in response to each of a plurality of test input transactions; and for each of the one or more parent data transformation components, formally verifying, at the one or more processors using a formal verification tool, that an instantiation of an abstracted hardware design for the parent data transformation component generates an expected output transaction in response to each of a plurality of test input transactions, wherein the abstracted hardware design for the parent data transformation component represents each of the one or more child data transformation components of the parent data transformation component with a corresponding abstracted component that is configured to, for a specific input transaction to the child data transformation component, produce a specific output transaction with a causal deterministic relationship to the specific input transaction, wherein during formal verification the formal verification tool is configured to select the specific input transaction and the specific output transaction pair to be each possible valid input transaction and valid output transaction pair for the child data transformation component;

wherein an instantiation of a hardware design embodies that hardware design in a form which can be tested to verify that hardware design.

* * * * *